US012005453B2

(12) United States Patent
Hoonejani et al.

(10) Patent No.: US 12,005,453 B2
(45) Date of Patent: Jun. 11, 2024

(54) PARTICLE MANIPULATION SYSTEM WITH MULTISORT VALVE AND FOCUSING ELEMENT

(71) Applicant: Owl biomedical, Inc., Goleta, CA (US)

(72) Inventors: Mehran Hoonejani, Goleta, CA (US); John Harley, Santa Barbara, CA (US)

(73) Assignee: Owl biomedical, Inc., Goleta, CA (US)

( * ) Notice: Subject to any disclaimer, the term of this patent is extended or adjusted under 35 U.S.C. 154(b) by 930 days.

(21) Appl. No.: 16/933,149

(22) Filed: Jul. 20, 2020

(65) Prior Publication Data

US 2020/0353470 A1 Nov. 12, 2020

Related U.S. Application Data

(63) Continuation-in-part of application No. 15/810,232, filed on Nov. 13, 2017, now Pat. No. 10,737,269,
(Continued)

(51) Int. Cl.
*B01L 3/00* (2006.01)
*F16K 99/00* (2006.01)
(Continued)

(52) U.S. Cl.
CPC ... *B01L 3/502761* (2013.01); *B01L 3/502707* (2013.01); *B01L 3/502715* (2013.01); *B01L 3/502738* (2013.01); *F16K 99/0046* (2013.01); *G01N 15/1404* (2013.01); *G01N 15/1484* (2013.01); *G01N 21/6402* (2013.01); *G01N 21/6428* (2013.01); *G01N 21/6486* (2013.01); *B01L 2200/0652* (2013.01); *B01L 2300/0627* (2013.01); *B01L 2300/0654* (2013.01);
(Continued)

(58) Field of Classification Search
CPC ........ B01L 3/502761; B01L 3/502707; B01L 3/502715; B01L 3/502738; B01L 2200/0652; B01L 2300/0627; B01L 2300/0654; B01L 2300/0864; B01L 2400/0622; B01L 2400/0633; F16K 99/0046; F16K 99/0048; G01N 15/1404; G01N 15/1484; G01N 21/6402; G01N 21/6428; G01N 21/6486; G01N 2015/149; G01N 2021/6439; G01N 2201/06113; G01N 2015/0053; G01N 15/1468
See application file for complete search history.

(56) References Cited

U.S. PATENT DOCUMENTS

| 2007/0178529 A1* | 8/2007 | Breidford ........... F16K 15/1825 435/7.1 |
| 2014/0220557 A1* | 8/2014 | Hart .................. G01N 33/4833 435/7.1 |
| 2018/0200717 A1* | 7/2018 | Yang ................ G01N 33/56972 |

* cited by examiner

*Primary Examiner* — Samuel P Siefke
(74) *Attorney, Agent, or Firm* — Jaquelin K. Spong

(57) ABSTRACT

A particle manipulation system uses a MEMS-based, microfabricated particle manipulation device which has a sample inlet channel, output channels, and a movable member formed on a substrate. The device may be used to separate a target particle from non-target material in a sample stream. In order to improve the sorter speed, accuracy or yield, the particle manipulation system may also include a microfluidic structure which focuses the target particles in a particular portion of the sample inlet channel. The particle manipulation device may have two separate sort output channels, wherein the sort channel used depends on the characteristics of the sort pulse delivered to the micromechanical particle manipulation device.

19 Claims, 28 Drawing Sheets

Related U.S. Application Data which is a continuation-in-part of application No. 15/638,320, filed on Jun. 29, 2017, now Pat. No. 9,962,702, application No. 16/933,149 is a continuation-in-part of application No. 15/638,320, filed on Jun. 29, 2017, now Pat. No. 9,962,702, which is a continuation-in-part of application No. 15/159,942, filed on May 20, 2016, now abandoned, which is a continuation of application No. 13/998,095, filed on Oct. 1, 2013, now Pat. No. 9,372,144.

(51) Int. Cl.
*G01N 15/14* (2006.01)
*G01N 15/1404* (2024.01)
*G01N 21/64* (2006.01)
G01N 15/149 (2024.01)

(52) U.S. Cl.
CPC .......... *B01L 2300/0864* (2013.01); *B01L 2400/0622* (2013.01); *B01L 2400/0633* (2013.01); *G01N 15/149* (2024.01); *G01N 2021/6439* (2013.01); *G01N 2201/06113* (2013.01)

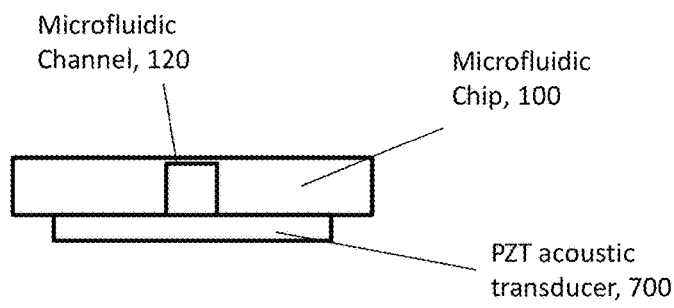
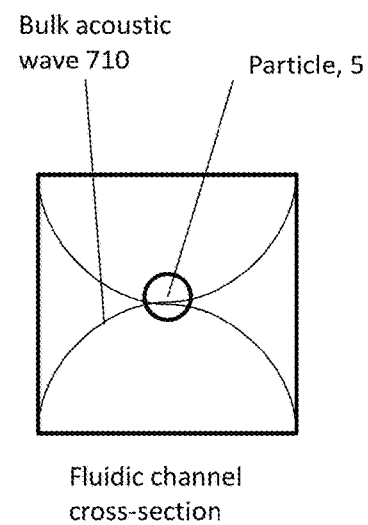
Fig. 11a
Fig. 11b

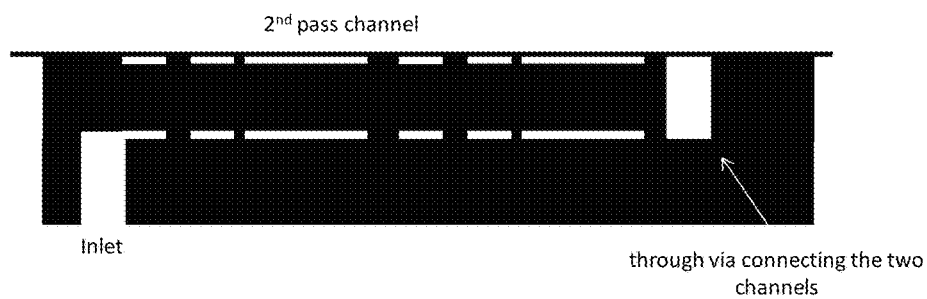
Fig. 26A. Side view of the focusing device
Fig. 26A
2nd pass channel
Inlet
through via connecting the two channels
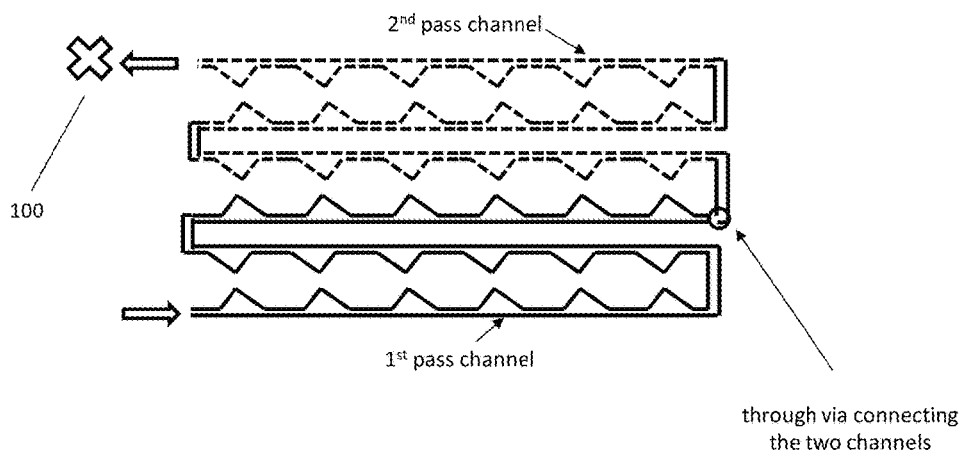
Fig. 26B. top view of the focusing device 100
Fig. 26B
2nd pass channel
1st pass channel
through via connecting the two channels
Fig. 26

PARTICLE MANIPULATION SYSTEM WITH MULTISORT VALVE AND FOCUSING ELEMENT

CROSS REFERENCE TO RELATED APPLICATIONS

This US Patent Application is a continuation-in-part from U.S. patent application Ser. No. 15/810,232 filed 13 Nov. 2017, which is a continuation-in-part from U.S. patent application Ser. No. 15/638,320 filed 29 Jul. 2017, which is a continuation-in-part from U.S. patent application Ser. No. 15/159,942, filed May 20, 2016, which is a continuation of U.S. patent application Ser. No. 13/998,095, filed. Oct. 1, 2013, now U.S. Pat. No. 9,404,838. Each of these documents is incorporated by reference in its entirety.

STATEMENT REGARDING FEDERALLY SPONSORED RESEARCH

Not applicable.

STATEMENT REGARDING MICROFICHE APPENDIX

Not applicable.

BACKGROUND

This invention relates to a system and method for manipulating small particles in a microfabricated fluid channel.

Microelectromechanical systems (MEMS) are very small, often moveable structures made on a substrate using surface or bulk lithographic processing techniques, such as those used to manufacture semiconductor devices. MEMS devices may be moveable actuators, sensors, valves, pistons, or switches, for example, with characteristic dimensions of a few microns to hundreds of microns. A moveable MEMS switch, for example, may be used to connect one or more input terminals to one or more output terminals, all microfabricated on a substrate. The actuation means for the moveable switch may be thermal, piezoelectric, electrostatic, or magnetic, for example. MEMS devices may be fabricated on a semiconductor substrate which may manipulate particles passing by the MEMS device in a fluid stream.

Thus, a MEMS device may be a movable valve, used as a sorting mechanism for sorting various particles from a fluid stream, such as cells from blood. The particles may be transported to the sorting device within the fluid stream enclosed in a microchannel, which flows under pressure. Upon reaching the MEMS sorting device, the sorting device directs the particles of interest such as a blood stem cell, to a separate receptacle, and directs the remainder of the fluid stream to a waste receptacle.

MEMS-based cell sorter systems may have substantial advantages over existing fluorescence-activated cell sorting systems (FACS) known as flow cytometers. Flow cytometers are generally large and expensive systems which sort cells based on a fluorescence signal from a tag affixed to the cell of interest. The cells are diluted and suspended in a sheath fluid, and then separated into individual droplets via rapid decompression through a nozzle. After ejection from a nozzle, the droplets are separated into different bins electrostatically, based on the fluorescence signal from the tag. Among the issues with these systems are cell damage or loss of functionality due to the decompression, difficult and costly sterilization procedures between sample, inability to re-sort sub-populations along different parameters, and substantial training necessary to own, operate and maintain these large, expensive pieces of equipment. For at least these reasons, use of flow cytometers has been restricted to large hospitals and laboratories and the technology has not been accessible to smaller entities.

A number of patents have been granted which are directed to such MEMS-based particle sorting devices. For example, U.S. Patent No.

U.S. Pat. No. 6,838,056 (the '056 patent) is directed to a MEMS-based cell sorting device, U.S. Pat. No. 7,264,972 bl (the '972 patent) is directed to a micromechanical actuator for a MEMS-based cell sorting device. U.S. Pat. No. 7,220,594 (the '594 patent) is directed to optical structures fabricated with a MEMS cell sorting apparatus, and U.S. Pat. No. 7,229,838 (the '838 patent) is directed to an actuation mechanism for operating a MEMS-based particle sorting system. Additionally, U.S. patent application Ser. No. 13/374,899 (the '899 application) and Ser. No. 13/374,898 (the '898 application) provide further details of other MEMS designs. Each of these patents ('056, '972, '594 and '838) and patent applications ('898 and '899) is hereby incorporated by reference.

SUMMARY

One feature of the MEMS-based microfabricated particle sorting system is that the fluid may be confined to small, microfabricated channels formed in a semiconductor substrate throughout the sorting process. The MEMS device may be a valve which separates one or more target particles from other components of a sample stream. The MEMS device may redirect the particle flow from one channel into another channel, when a signal indicates that a target particle is present. This signal may be photons from a fluorescent tag which is affixed to the target particles and excited by laser illumination in an interrogation region upstream of the MEMS device. Thus, the MEMS device may be a particle or cell sorter operating on a fluid sample confined to a microfabricated fluidic channel, but using detection means similar to a FACS flow cytometer.

A substantial improvement may be made over the prior art devices by having at least one of the microfabricated fluidic channels route the flow out of the plane of fabrication of the microfabricated valve. A valve with such an architecture has the advantage that the pressure resisting the valve movement is minimized when the valve opens or closes, because the movable member is not required to move a column of fluid out of the way. Instead, the fluid containing the non-target particles may move over and under the movable member to reach the waste channel. Furthermore, the force-generating apparatus may be disposed closer to the movable valve, resulting in higher forces and faster actuation speeds. As a result, the time required to open or close the valve may be much shorter than the prior art valve, improving sorting speed and accuracy. The systems and methods disclosed here may describe such a microfabricated particle sorting device with at least one out-of-plane channel. Furthermore, because of the small size of the features used in such a device, a fluidic focusing mechanism can dramatically improve the performance of the device by urging the particles into a portion of the fluidic channel. By locating the particles, the uncertainty is diminished, which may improve the sort speed and accuracy.

The particle manipulation device may further comprise a sheath fluid inlet in fluid communication with the sample inlet channel; and a focusing element coupled to the sheath fluid inlet, which is configured to urge the target particles into a particular portion of the sample inlet channel, wherein the focusing element comprises a microfabricated fluid channel with one substantially straight sidewall segment and an adjacent curved sidewall segment, wherein the straight and the curved sidewall segments define a fluid channel segment with a variable channel width. These variable channel width segments may define expansion/contraction cavities within the microfluidic channel, wherein the cavity is defined by the expanding portion followed by the contracting portion.

The particles suspended in the fluid stream may experience hydrodynamic forces as a result of these cavities. The first may be an inertial lift force, which is a combination of shear gradient lift resulting from the flow profile parabolic nature, and wall lift force. In addition, the particles may experience Dean flow drag: which is the drag force exerted on the particles as a result of the secondary dean flow induced by curved streamlines within the cavities. It is possible to balance these two forces by proper selection of the geometrical parameters of height, size, aspect ratio and placement with respect to the expansion/contraction cavities. Accordingly, these two forces may be balanced by introduction of the expansion-contraction cavities described below. This balance has not been achieved heretofore, but it may be achieved using the geometrical ranges set forth here.

The device may also be equipped with a particulate filter. The filter may further include filter barrier elements, wherein filter barrier elements are spaced so as to allow fluid to flow therethrough, but to trap debris and contamination flowing in the sample stream. The filter may also have a transparent layer above the filter elements, which may allow analysis, identification and removal of the contamination. Accordingly, the transparent layer may allow viewing of the material trapped in the filter.

Because of the effective focusing apparatus and filter element, the particles may arrive at the sorter free of debris or contaminants, and in a tightly confined streamline in a particular portion of the microchannel. In effect, because the particles are in a well-defined portion of the channel and with a well-defined velocity, some novel sort strategies may be brought to bear on the particles within the system. In particular, it is possible that a plurality of sort output paths may be provided, and each target particle may be directed into one of the plurality of sort output paths. The details of the current pulse delivered to the electromagnetic actuation means may determine which of a plurality of sort output paths the trajectory of the particle takes. In other words, in addition to a waste channel for non-target material, the target particle may be directed into one of a plurality of sort output channels. Such a multi-channel sorting valve ("multisort valve"), that is, a microfabricated particle sorting valve having a plurality of sort output channels, is described below.

Accordingly, a micromechanical particle manipulation device is described which is formed on a surface of a fabrication substrate. The device may include a microfabricated, movable member formed on the substrate, wherein the movable member moves from a first position to a second position in response to a sort waveform applied to an actuator, which generates a force to move the movable member, wherein the motion is substantially in a plane parallel to the surface of the substrate. The device may further include a sample inlet channel formed in the substrate and through which a fluid flows, the fluid including target particles and non-target material, wherein the flow in the sample inlet channel is substantially parallel to the surface. The device may also include at least three separate output channels including at least two separate sort output channels into which the microfabricated movable member diverts the target particles, and a waste output channel into which the non-target material flows, and wherein the flow in waste output channel is substantially orthogonal to the plane, and wherein the waste output channel is located directly below at least a portion of the microfabricated member over at least a portion of its motion, wherein the target particles are diverted into one of the at least two separate sort output channels by the movable member, depending on the characteristics of the sort waveform.

These and other features and advantages are described in, or are apparent from, the following detailed description.

BRIEF DESCRIPTION OF THE DRAWINGS

Various exemplary details are described with reference to the following figures, wherein:

FIG. 11a is simplified schematic diagram of an emobodiment of an acoustic focusing element acting on a microchannel of the particle manipulation device;

FIG. 11b shows the acoustic waves in the microchannel.

FIG. 26 is a simplified schematic diagram of a fluid path containing a plurality of triangular cavities, as well as a 90° turn out of the plane of the fluid path. FIG. 26A shows the side view and FIG. 26B shows the top view;

FIG. 27A shows the flow at the end of the $1^{st}$ section, FIG. 27B shows the flow at the start of the $2^{nd}$ section and FIG. 27C shows the flow at the end of the $2^{nd}$ channel.

It should be understood that the drawings are not necessarily to scale, and that like numbers may refer to like features.

DETAILED DESCRIPTION

The system described herein is a particle sorting system which may make use of the microchannel architecture of a MEMS particle manipulation system. More generally, the systems and methods describe a particle manipulation system with a sample inlet channel and a plurality of output channels, wherein at least one of the plurality of output channels is disposed in a different plane than the sample inlet channel. In addition, these microfluidic devices are made with very tight tolerances and narrow separations, which can benefit significantly from focusing the suspended particles into a smaller portion of the flow channel. Coupled with a hydrodynamic focusing element, a stream of particles can be formed within the channels that has well-defined spatial and hydrodynamic properties. This well controlled situation may enable novel particle sorting protocols, such as the one described below. As will be made clear in the discussion below, this architecture has some significant advantages relative to the prior art.

In the figures discussed below, similar reference numbers are intended to refer to similar structures, and the structures are illustrated at various levels of detail to give a clear view of the important features of this novel device. It should be understood that these drawings do not necessarily depict the structures to scale, and that directional designations such as "top," "bottom," "upper," "lower," "left" and "right" are arbitrary, as the device may be constructed and operated in any particular orientation. In particular, it should be understood that the designations "sort" and "waste" are interchangeable, as they only refer to different populations of particles, and which population is called the "target" or "sort" population is arbitrary.

Figure 1:
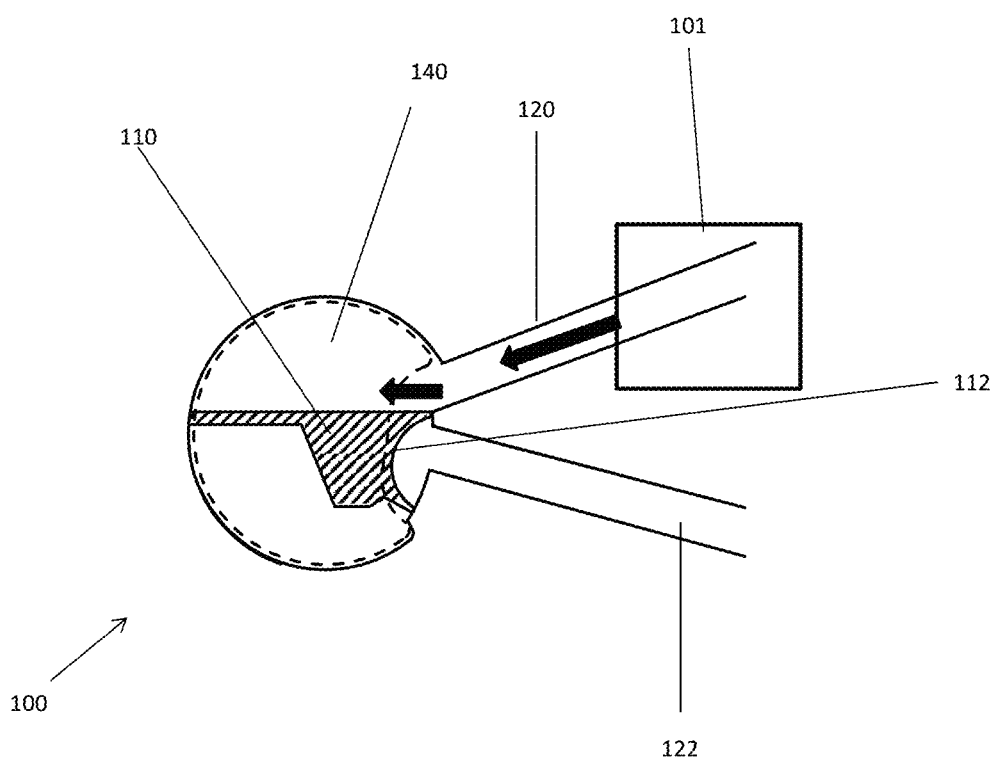
FIG. 1 is a simplified plan view of a microfabricated particle sorting system in the quiescent (no sort) position.

FIG. 1 is a plan view illustration of the novel microfabricated fluidic device 100 in the quiescent (un-actuated) position. The device 100 may include a microfabricated fluidic valve or movable member 110 and a number of microfabricated fluidic channels 120, 122 and 140. The fluidic valve 110 and microfabricated fluidic channels 120, 122 and 140 may be formed in a suitable substrate, such as a silicon substrate, using MEMS lithographic fabrication techniques as described in greater detail below. The fabrication substrate may have a fabrication plane in which the device is formed and in which the movable member 110 moves.

A sample stream may be introduced to the microfabricated fluidic valve 110 by a sample inlet channel 120. The sample stream may contain a mixture of particles, including at least one desired, target particle and a number of other undesired, nontarget materials. The particles may be suspended in a fluid. For example, the target particle may be a biological material such as a stem cell, a cancer cell, a zygote, a protein, a T-cell, a bacteria, a component of blood, a DNA fragment, for example, suspended in a buffer fluid such as saline. The sample inlet channel 120 may be formed in the same fabrication plane as the valve 110, such that the flow of the fluid is substantially in that plane. The motion of the valve 110 is also within this fabrication plane. The decision to sort/save or dispose/waste a given particle may be based on any number of distinguishing signals. In one exemplary embodiment, the decision is based on a fluorescence signal emitted by the particle, based on a fluorescent tag affixed to the particle and excited by an illuminating laser. The distinction between the target particles and nontarget material may be made in laser interrogation region 101. There may be a plurality of laser interrogation regions 101, although only one is shown in FIG. 1. Details as to this detection mechanism are well known in the literature, and further discussed below with respect to FIG. 21. However, other sorts of distinguishing signals may be anticipated, including scattered light or side scattered light which may be based on the morphology of a particle, or any number of mechanical, chemical, electric or magnetic effects that can identify a particle as being either a target particle, and thus sorted or saved, or an nontarget particle and thus rejected or otherwise disposed of.

With the valve 110 in the position shown, the input stream passes unimpeded to an output orifice and channel 140 which is out of the plane of the sample inlet channel 120, and thus out of the fabrication plane of the device 100. That is, the flow is from the sample inlet channel 120 to the output orifice 140, from which it flows substantially vertically, and thus orthogonally to the sample inlet channel 120. This output orifice 140 leads to an out-of-plane channel that may be perpendicular to the plane of the paper showing FIG. 1, and depicted in the cross sectional views of FIGS. 4a-4c. More generally, the output channel 140 is not parallel to the plane of the sample inlet channel 120 or sort channel 122, or the fabrication plane of the movable member 110.

The output orifice 140 may be a hole formed in the fabrication substrate, or in a covering substrate that is bonded to the fabrication substrate. A relieved area above and below the sorting valve or movable member 110 allows fluid to flow above and below the movable member 110 to output orifice 140, and shown in more detail in FIGS. 4a-4c. Further, the valve 110 may have a curved diverting surface 112 which can redirect the flow of the input stream into a sort output stream, as described next with respect to FIG. 2. The contour of the orifice 140 may be such that it overlaps some, but not all, of the sample inlet channel 120 and sort channel 122. By having the contour 112 overlap the sample inlet channel, and with relieved areas described above, a route exists for the input stream to flow directly into the waste orifice 140 when the movable member or valve 110 is in the un-actuated waste position.

Figure 2:
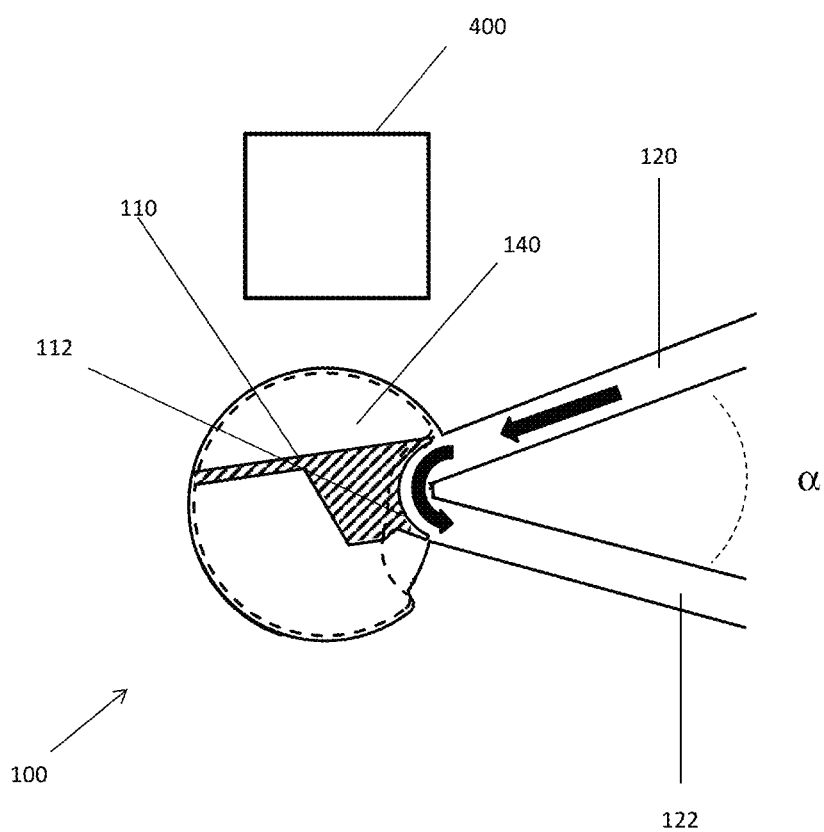
FIG. 2 is a simplified plan view of a microfabricated particle sorting system in the actuated (sort) position.

FIG. 2 is a plan view of the microfabricated device 100 in the actuated position. In this position, the movable member or valve 110 is deflected upward into the position shown in FIG. 2. The diverting surface 112 is a sorting contour which redirects the flow of the sample inlet channel 120 into the sort output channel 122. The output sort channel 122 may lie in substantially the same plane as the sample inlet channel 120, such that the flow within the sort channel 122 is also in substantially the same plane as the flow within the sample inlet channel 120. There may be an angle a between the sample inlet channel 120 and the sort channel 122, This angle may be any value up to about 90 degrees. Actuation of movable member 110 may arise from a force from force-generating apparatus 400, shown generically in FIG. 2. In some embodiments, force-generating apparatus may be an electromagnet, however, it should be understood that force-generating apparatus may also be electrostatic, piezoelectric, or some other means to exert a force on movable member 110, causing it to move from a first position (FIG. 1) to a second position (FIG. 2).

More generally, the micromechanical particle manipulation device shown in FIGS. 1 and 2 may be formed on a surface of a fabrication substrate, wherein the micromechanical particle manipulation device may include a microfabricated, movable member 110 having a first diverting surface 112, wherein the movable member 110 moves from a first position to a second position in response to a force applied to the movable member, wherein the motion is substantially in a plane parallel to the surface, a sample inlet channel 120 formed in the substrate and through which a fluid flows, the fluid including one or more target particles and non-target material, wherein the flow in the sample inlet channel is substantially parallel to the surface, and a plurality of output channels 122, 140 into which the microfabricated member diverts the fluid, and wherein the flow in at least one of the output channels 140 is not parallel to the plane, and wherein at least one output channel 140 is located directly below at least a portion of the movable member 110 over at least a portion of its motion.

In one embodiment, the diverting surface 112 may be nearly tangent to the input flow direction as well as the sort output flow direction, and the slope may vary smoothly between these tangent lines. In this embodiment, the moving mass of the stream has a momentum which is smoothly shifted from the input direction to the output direction, and thus if the target particles are biological cells, a minimum of force is delivered to the particles. As shown in FIGS. 1 and 2, the micromechanical particle manipulation device 100 has a first diverting surface 112 with a smoothly curved shape, wherein the surface which is substantially tangent to the direction of flow in the sample inlet channel at one point on the shape and substantially tangent to the direction of flow of a first output channel at a second point on the shape, wherein the first diverting surface diverts flow from the sample inlet channel into the first output channel when the movable member 110 is in the first position, and allows the flow into a second output channel in the second position.

In other embodiments, the overall shape of the diverter 112 may be circular, triangular, trapezoidal, parabolic, or v-shaped for example, but the diverter serves in all cases to direct the flow from the sample inlet channel to another channel.

It should be understood that although channel 122 is referred to as the "sort channel" and orifice 140 is referred to as the "waste orifice", these terms can be interchanged such that the sort stream is directed into the waste orifice 140 and the waste stream is directed into channel 122, without any loss of generality. Similarly, the "sample inlet channel" 120 and "sort channel" 122 may be reversed. The terms used to designate the three channels are arbitrary, but the inlet stream may be diverted by the valve 110 into either of two separate directions, at least one of which does not lie in the same plane as the other two. The term "substantially" when used in reference to an angular direction, i.e. substantially tangent or substantially vertical, should be understood to mean within 15 degrees of the referenced direction. For example, "substantially orthogonal" to a line should be understood to mean from about 75 degrees to about 105 degrees from the line.

Figure 3A:
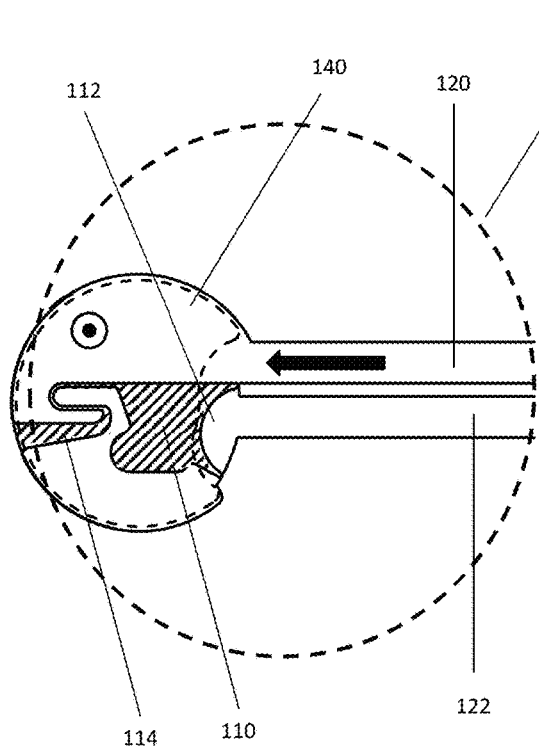
FIG. 3a is a simplified plan view of a microfabricated particle sorting system showing the field of view of the detector, with the microfluidic valve in the quiescent (no sort) position.
Figure 3B:
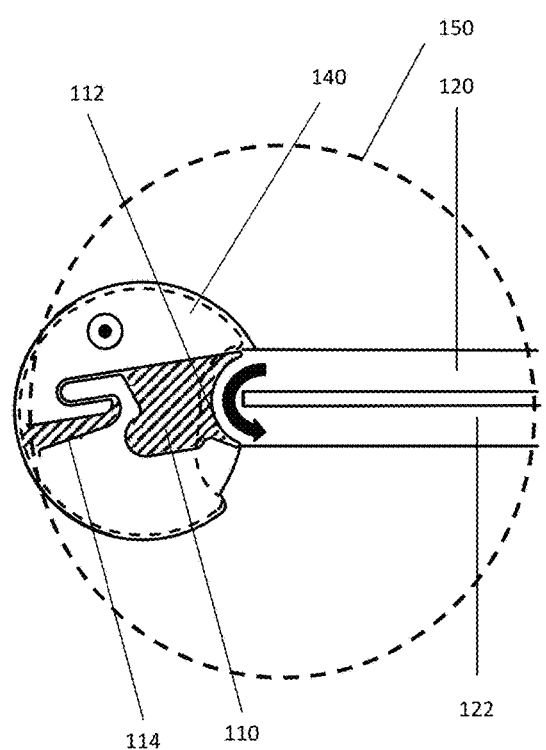
FIG. 3b is a simplified illustration of a microfabricated particle sorting system showing the field of view of the detector, with the microfluidic valve in the actuated (sort) position.

FIGS. 3a and 3b illustrate an embodiment wherein the angle a between the sample inlet channel 120 and the sort channel 122 is approximately zero degrees. Accordingly, the sort channel 122 is essentially antiparallel to the sample inlet channel 120, such that the flow is from right to left in the sample inlet channel 120. With valve 110 in the un-actuated, quiescent position shown in FIG. 3a, the inlet stream flows straight to the waste orifice 140 and vertically out of the device 100.

In FIG. 3b, the valve 110 is in the actuated, sort position. In this position, the flow is turned around by the diverting surface 112 of the valve 110 and into the antiparallel sort channel 122. This configuration may have an advantage in that the field of view of the detector 150 covers both the sample inlet channel 120 and the sort channel 122. Thus a single set of detection optics may be used to detect the passage of a target particle through the respective channels. It may also be advantageous to minimize the distance between the detection region and the valve 110, in order to minimize the timing uncertainty in the opening and closing of the valve.

Figure 4A:
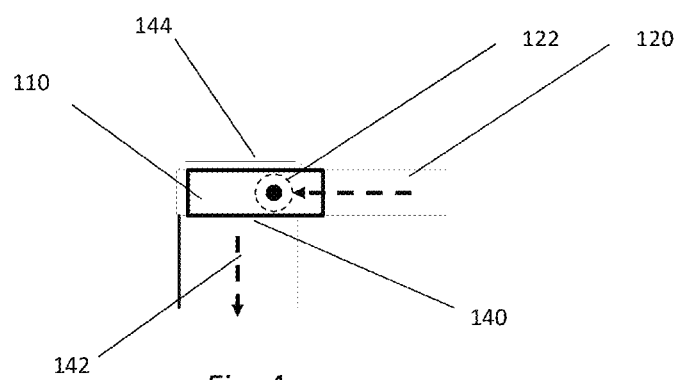
FIG. 4a is a simplified cross sectional view of a microfabricated particle sorting system in the actuated (sort) position, showing the flow of the sample stream into the sort channel which is in the same plane as the sample inlet channel.
Figure 4B:
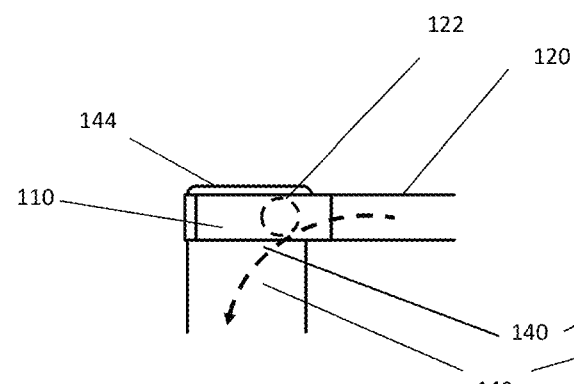
FIG. 4b is a simplified cross sectional view of a microfabricated particle sorting system in the quiescent (no sort) position, showing the flow of the sample stream into the waste channel which is not in the same plane as the sample inlet channel.
Figure 4C:
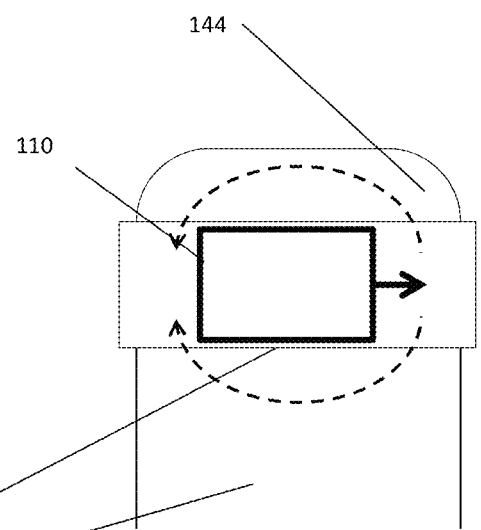
FIG. 4c is a simplified cross sectional view of a microfabricated particle sorting system in the quiescent (no sort) position, showing the flow of the sample stream into the waste channel which is not in the same plane as the sample inlet channel, wherein the sample stream flows around the top and the bottom of the diverter.

The movable member or valve 110 may be attached to the substrate with a flexible spring 114. The spring may be a narrow isthmus of substrate material. In the example set forth above, the substrate material may be single crystal silicon, which is known for its outstanding mechanical properties, such as its strength, low residual stress and resistance to creep. With proper doping, the material can also be made to be sufficiently conductive so as to avoid charge build up on any portion of the device, which might otherwise interfere with its movement. The spring may have a serpentine shape as shown, having a width of about 1 micron to about 10 microns and a spring constant of between about 10 N/m and 100 N/m, and preferably about 40 N/m FIGS. 4a, 4b, 4c are cross sectional views illustrating the operation of the out-of-plane waste channel 140. FIG. 4c is slightly enlarged relative to FIGS. 4a and 4b, in order to show detail of the flow around the movable member 110 and into the waste channel 142 through waste orifice 140. In this embodiment, the waste channel 142 is vertical, substantially orthogonal to the inlet stream 120 and sort stream 122. It should be understood that other embodiments are possible other than orthogonal, but in any event, the flow into waste channel 142 is out of the plane of the flow in the sample inlet channel 120 and/or sort channel 122. As shown in FIG. 4a, with the valve in the sort, actuated position, the inlet stream and target particle may flow into the sort stream, which in FIG. 4a is out of the paper, and the waste orifice 140 is largely, though not completely, blocked by the movable member 110. The area 144 (shown more clearly in FIG. 4c) on top of the valve or movable member 110 may be relieved to provide clearance for this flow.

When the valve or movable member 110 is un-actuated as in FIG. 4b, the flow of the sample inlet channel 120 may flow directly into the waste channel 142 by going over, around or by the movable member or valve 110. The area 144 on top of the valve or movable member 110 may be relieved to provide clearance for this flow. The relieved area 144 is shown in greater detail in the enlarged FIG. 4c. Thus, when the movable member 110 is un-actuated, the flow will be sent directly to the waste channel. When the movable member 110 is actuated, most of the fluid will be directed to the sort channel, although liquid may still flow over and under the movable member 110.

Thus, the purpose of providing flow both under and over the movable member 110 is to reduce the fluid pressure produced by the actuator motion in the region behind the valve or movable member 110. In other words, the purpose is to provide as short a path as possible between the high pressure region in front of the valve 110 and the low pressure region behind the valve. This allows the valve to operate with little pressure resisting its motion. As a result, the movable valve 110 shown in FIGS. 1-4c may be substantially faster than valves which have all channels disposed in the same plane.

Another advantage of the vertical waste channel 142 is that by positioning it directly underneath a stationary permeable feature 130 and movable permeable feature 116, the magnetic gap between the permeable features 116 and 130 can be narrower than if the fluidic channel went between them. The narrower gap enables higher forces and thus faster actuation compared to prior art designs. A description of the magnetic components and the magnetic actuation mechanism will be given next, and the advantages of the out-of-plane channel architecture will be apparent.

Figure 5:
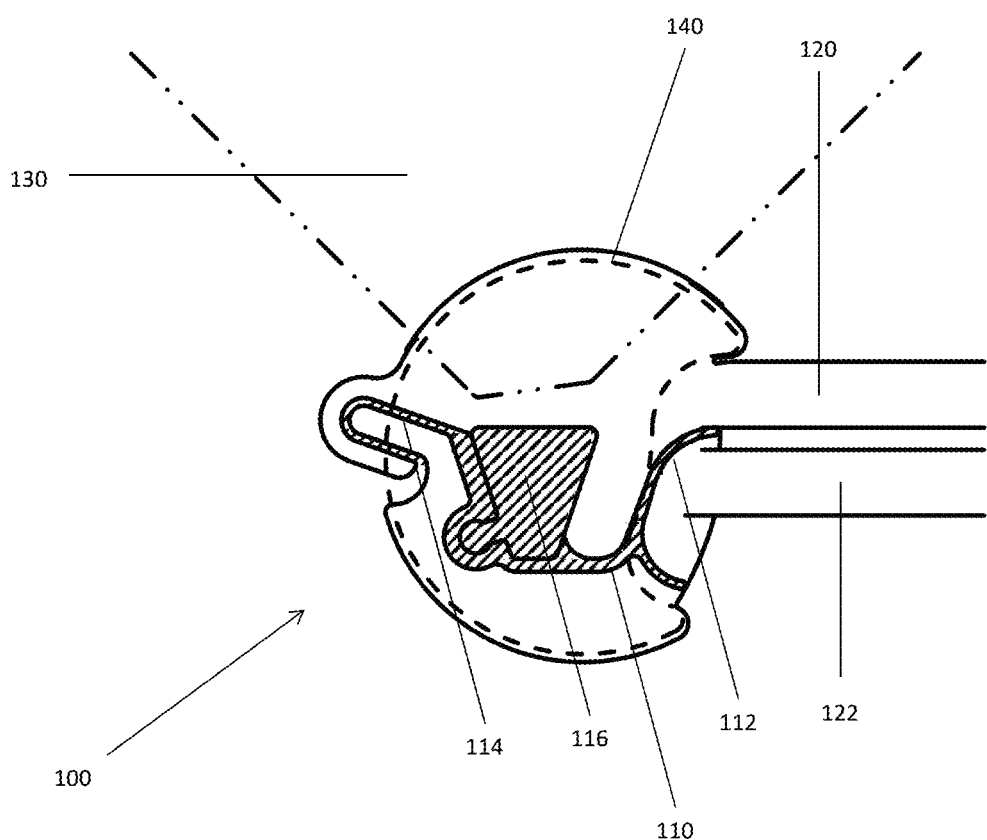
FIG. 5 is a simplified plan view of a microfabricated particle sorting system in the quiescent (no sort) position, showing the stationary magnetically permeable feature.

FIG. 5 is a plan view of another exemplary embodiment of device 100 of the device 100, showing the disposition of a stationary permeable feature 130 and further detail of the movable member 110. In this embodiment, the movable member 110 may include the diverting surface 112, the flexible hinge or spring 114, and a separate area 116 circumscribed but inside the line corresponding to movable member 110. This area 116 may be inlaid with a permeable magnetic material such as nickel-iron permalloy, and may function as described further below.

A magnetically permeable material should be understood to mean any material which is capable of supporting the formation of a magnetic field within itself. In other words, the permeability of a material is the degree of magnetization that the material obtains in response to an applied magnetic field.

The terms "permeable material" or "material with high magnetic permeability" as used herein should be understood to be a material with a permeability which is large compared to the permeability of air or vacuum. That is, a permeable material or material with high magnetic permeability is a material with a relative permeability (compared to air or vacuum) of at least about 100, that is, 100 times the permeability of air or vacuum which is about $1.26 \times 10^{-6}$ $H \cdot m^{-1}$. There are many examples of permeable materials, including chromium (Cr), cobalt (Co), nickel (Ni) and iron (Fe) alloys. One popular permeable material is known as Permalloy, which has a composition of between about 60% and about 90% Ni and 40% and 10% iron. The most common composition is 80% Ni and 20% Fe, which has a relative permeability of about 8,000.

It is well known from magnetostatics that permeable materials are drawn into areas wherein the lines of magnetic flux are concentrated, in order to lower the reluctance of the path provided by the permeable material to the flux. Accordingly, a gradient in the magnetic field urges the motion of the movable member 110 because of the presence of inlaid permeable material 116, towards areas having a high concentration of magnetic flux. That is, the movable member 110 with inlaid permeable material 116 will be drawn in the direction of positive gradient in magnetic flux.

Figure 6:
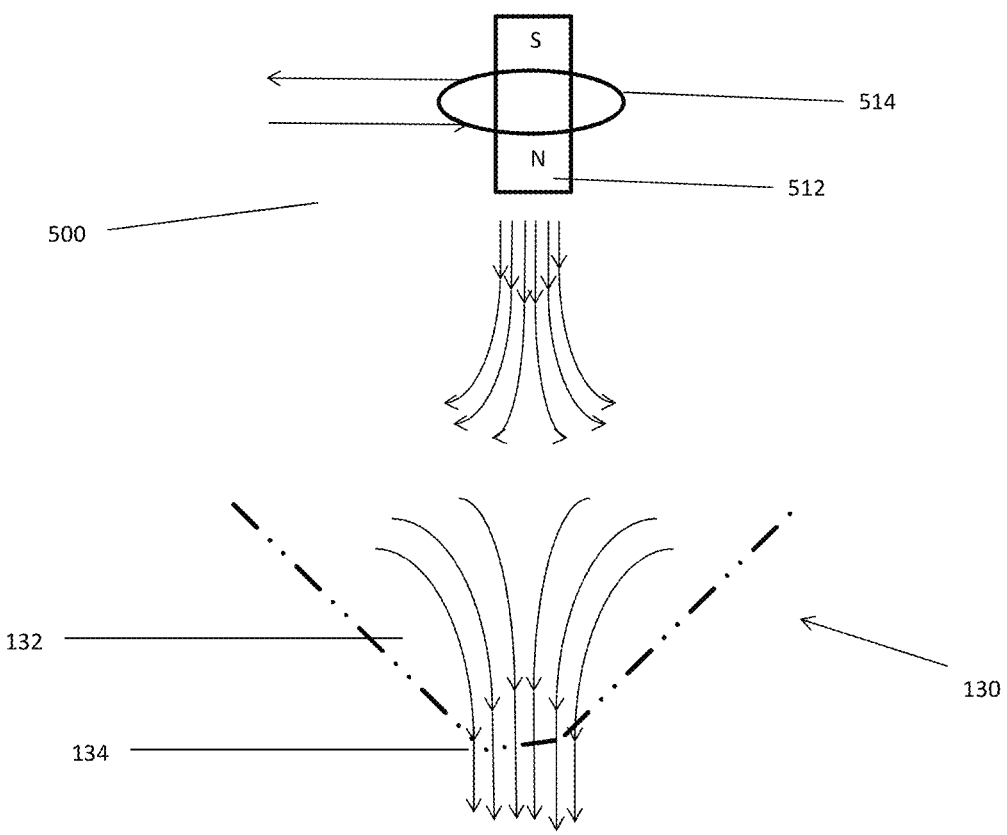
FIG. 6 is a plan view of the actuation mechanism for the microfabricated particle sorting system, showing the functioning of the external magnetic field in combination with the stationary magnetically permeable feature.
Figure 7:
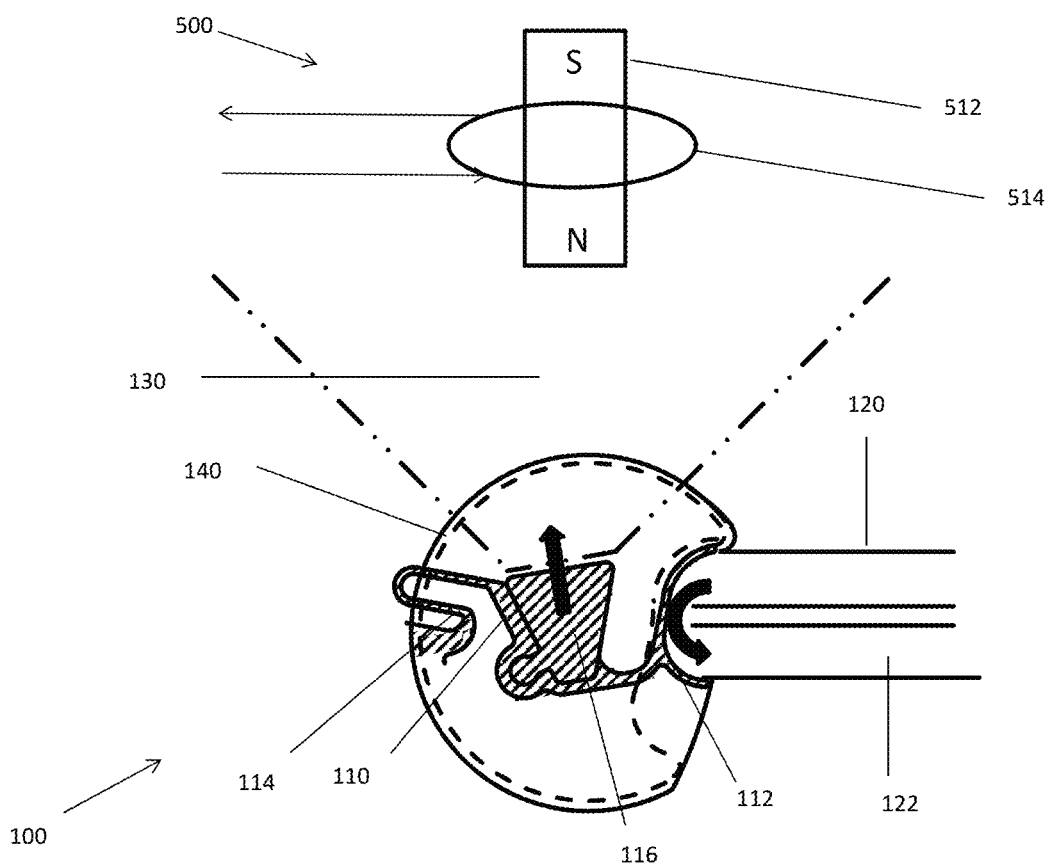
FIG. 7 is a plan view of the actuation mechanism for the microfabricated particle sorting system, showing the functioning of the external magnetic field in combination with the stationary magnetically permeable feature, in the actuated (sort) position.

An external source of magnetic field lines of flux may be provided outside the device 100, as shown in FIG. 6. This source may be an electromagnet 500. The electromagnet 500 may include a permeable core 512 around which a conductor 514 is wound. The wound conductor or coil 514 and core 512 generate a magnetic field which exits the pole of the magnet, diverges, and returns to the opposite pole, as is well known from electromagnetism. Accordingly, the movable member 110 is generally drawn toward the pole of the electromagnet 500 as shown in FIG. 7.

However, the performance of the device 100 can be improved by the use of a stationary permeable feature 130. The term "stationary feature" should be understood to mean a feature which is affixed to the substrate and does not move relative to the substrate, unlike movable member or valve 110. A stationary permeable feature 130 may be shaped to collect these diverging lines of flux and refocus them in an area directly adjacent to the movable member 110 with inlaid permeable material. The stationary permeable feature 130 may have an expansive region 132 with a narrower throat 134. The lines of flux are collected in the expansive region 132 and focused into and out of the narrow throat area 134. Accordingly, the density of flux lines in the throat area 134 is substantially higher than it would be in the absence of the stationary permeable feature 130. Thus, use of the stationary permeable feature 130 though optional, allows a higher force, faster actuation, and reduces the need for the electromagnet 500 to be in close proximity to the device 100. From the narrow throat area 134, the field lines exit the permeable material and return to the opposite magnetic pole of the external source 500. But because of the high concentration of field lines in throat area 134, the permeable material 116 inlaid into movable member 110 may be drawn toward the stationary permeable feature 130, bringing the rest of movable member with it.

When the electromagnet is quiescent, and no current is being supplied to coil 514, the restoring force of spring 114 causes the movable member 110 to be in the "closed" or "waste" position. In this position, the inlet stream passes unimpeded through the device 100 to the waste channel 140. This position is shown in FIG. 5. When the electromagnet 500 is activated, and a current is applied through coil 514, a magnetic field arises in the core 512 and exits the pole of the core 512. These lines of flux are collected and focused by the stationary permeable feature 130 and focused in the region directly adjacent to the throat 134. As mentioned previously, the permeable portion 116 of the movable member 110 is drawn toward the throat 134, thus moving the movable member 110 and diverting surface 112 such that the inlet stream in sample inlet channel 120 is redirected to the output or sort channel 122. This position is shown in FIG. 7.

Permalloy may be used to create the permeable features 116 and 130, although it should be understood that other permeable materials may also be used. Permalloy is a well known material that lends itself to MEMS lithographic fabrication techniques. A method for making the permeable features 116 and 130 is described further below.

As mentioned previously, having the waste channel 140 and 142 directly beneath the movable member or valve 110 allows the movable permeable feature 116 to be disposed much closer to the stationary permeable feature 130. If instead the waste channel were in the same plane, this gap would have to be at least large enough to accommodate the waste channel, along with associated tolerances. As a result, actuation forces are higher and valve opening and closing times are much shorter. This in turn corresponds to either faster sorting or better sorting accuracy, or both.

With the use of the electromagnetic actuation technique described above, actuation times on the order of 10 microseconds can be realized. Accordingly, the particle sorting device is capable of sorting particles at rates in excess of 50 kHz or higher, assuming 10 microseconds required to pull the actuator in, and 10 microseconds required to return it to the as-manufactured position.

Figure 8:
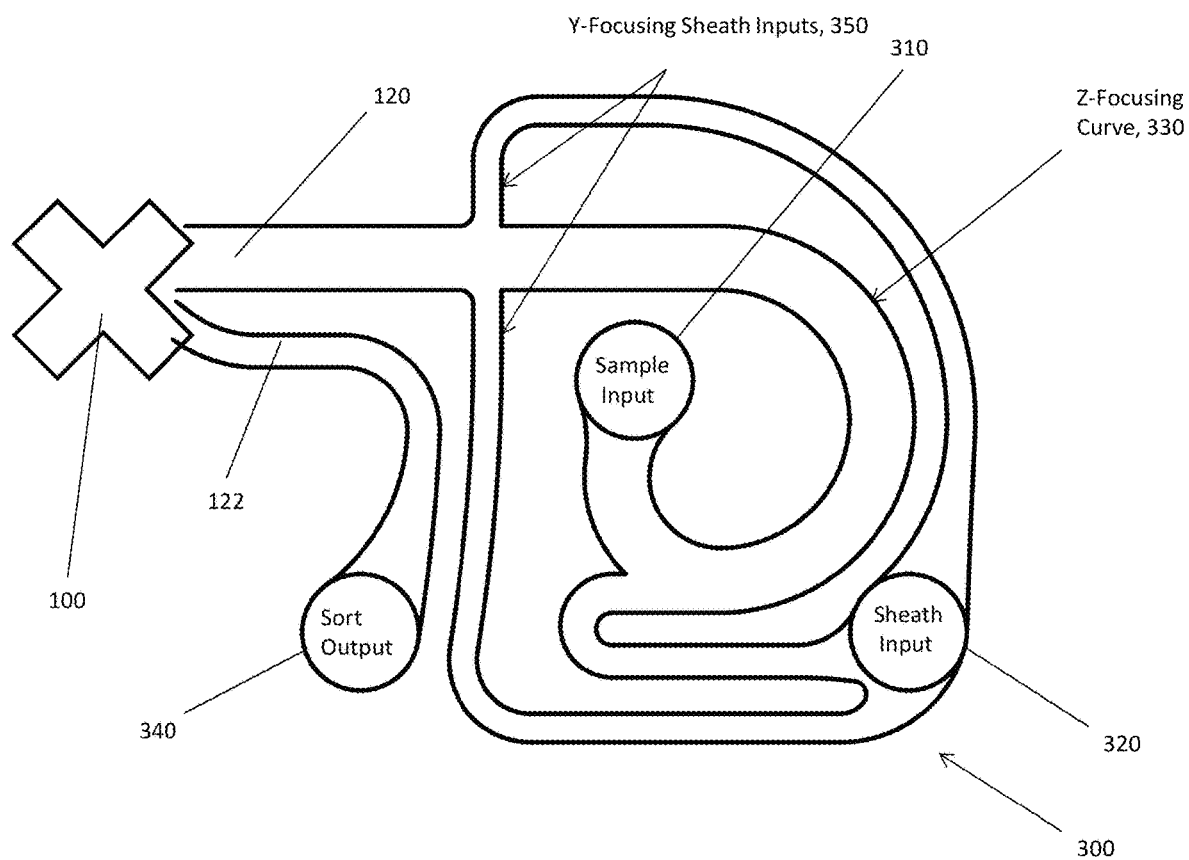
FIG. 8 is a plan view of the microfabricated particle sorting system in combination with a hydrodynamic focusing manifold.

Because of the microfabricated nature of particle manipulation device 100, it lends itself to techniques that can make use of such an enclosed, well defined architecture. One such technique is illustrated in FIG. 8, wherein the microfabricated particle manipulation device may be coupled to a microfabricated fluidic focusing element 300. The focusing element 300 may include at least one additional sheath fluid inlet channel 320 that provides a sheath fluid to the sample stream and also a z-focusing curve 330 coupled to the sheath fluid inlet channel 320. The sheath fluid may be used to adjust the concentration or positioning of the target particles within the sample inlet channel. The focusing element 300 may be configured to urge the target particles into a particular portion of the sample inlet channel 120, such that the sorting process has fewer errors, as described further below. The focusing element 300 may be disposed in substantially the same plane as the movable member 110, and may be formed in the same substrate surface as the movable member 110 and sample inlet channel 120. The focusing element 300 may rely on inertial forces to focus the particles, as will be described further below. These forces may require relatively large flow rates to be effective. The microfabricated particle manipulation system with out-of-plane channel may be particularly suited to such an inertial focusing device, because of the narrow channels and high flow rates.

FIG. 8 depicts the microfabricated focusing element 300 which may be used to focus the particles in a certain area within the fluid stream. As the name suggests, the sheath fluid inlet channel 320 adds a sheath fluid to the sample stream, which is a buffering fluid which tends to dilute the flow of particles in the stream and locate them in a particular portion of the stream. The combined fluid then flows around a focusing element 300 coupled to the sample inlet channel 120. The focusing element 300 may include here a z-focusing curve 330, which tends to herd the particles into a particular plane within the flow. This plane is substantially in the plane of the paper of FIG. 8. The combined fluid in the focusing element 300 then passes another intersection point, a "y-intersection point" 350, which introduces additional sheath fluid above and below the plane of particles. At the y-intersection point 350, two flows may join the z-focus channel 330 from substantially antiparallel directions, and orthogonal to the z-focus channel 330. This intersection may compress the plane of particles into a single point, substantially in the center of the stream. Accordingly, at the y-intersection point 350 the target particles may be compressed from a plane to a stream line near the center of the z-focus channel 330 and sample inlet channel 120. Focusing the particles into a certain volume tends to decrease the uncertainly in their location, and thus the uncertainty in the timing of the opening and closing of the movable member or valve 110. Such hydrodynamic focusing may therefore improve the speed and/or accuracy of the sorting operation.

In one exemplary embodiment of the microfabricated particle manipulation device 100 with hydrodynamic focusing illustrated in FIG. 8, the angular sweep of z-bend 330 is a curved arc of about 180 degrees. That is, the approximate angular sweep between the junction of the sheath fluid inlet channel 320 and the y-intersection point 350, may be about 180 degrees. Generally, the radius of curvature of the z-bend 330 may be at least about 100 microns and less than about 500 microns, and the characteristic dimension, that is the width, of the channels is typically about 50 microns to provide the focusing effect. In one embodiment, the radius of curvature of the channel may be about 250 microns, and the channel widths, or characteristic dimensions, for the sample inlet channel 120 and z-bend channel 330 are on the order of about 50 microns. These characteristic dimensions may provide a curvature sufficient to focus the particles, such that they tend to be confined to the plane of the paper upon exit from the z-focus channel 330 at y-intersection point 350. This plane is then compressed to a point in the channel at the y-intersection point 350. Accordingly, the y-intersection 350 flows along with the z-focusing element 330 may urge the particles into a single stream line near the center of the microfabricated sample inlet channel 120.

Figure 9:
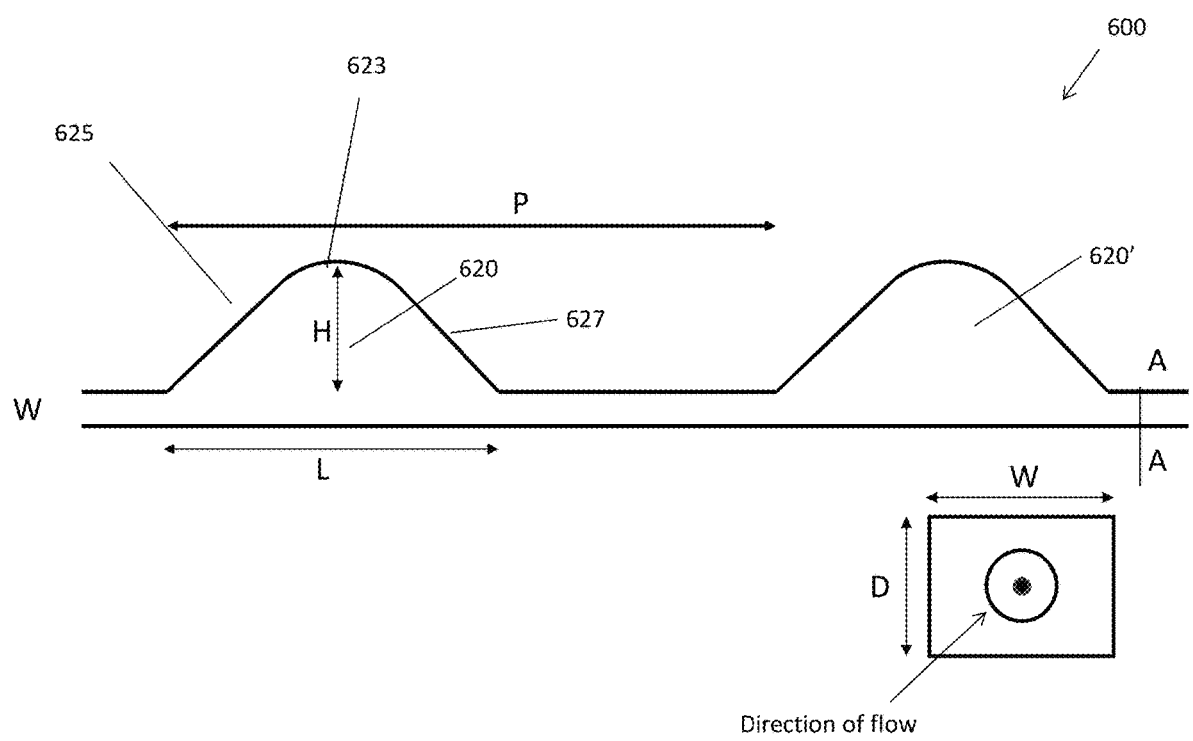
FIG. 9 is simplified schematic diagram of the novel variable cross section focusing channel.

FIG. 9 shows another embodiment of a focusing element, 600. In this embodiment, the focusing element 600 includes a plurality of segments having a variable lateral dimension or cross section. The variable cross section portion of the channel serves to urge or focus the particles into a particular portion of the stream flowing in the channel. The discussion now turns to the design and performance details of this variable cross section focusing channel as applied to the above described microfabricated particle sorter 100.

The novel flow channel may possess portions of variable cross section, wherein the variable cross section arises from the shapes of the sidewalls of the flow channel. These variable portions may have one sidewall which is substantially straight with respect to the flow direction, and an adjacent side wall which is not straight, or at least not parallel to the substantially straight portion. In particular, this adjacent sidewall may be triangular or parabolic in shape, deviating away from the straight sidewall in an expanding region, to a point of maximum channel width, before coming back to the nominal distance between the sidewalls in a contracting region. The expanding portion, maximum point, and contracting portion may constitute what is hereafter referred to as a fluid "cavity" 620 in the microfabricated channel. Accordingly, the variable channel width segments may define expansion/contraction cavities 620, 620' within the microfluidic channel, wherein the cavity is defined by the expanding portion followed by the contracting portion.

The cavity 620 should be understood to be in fluid communication with the microfabricated fluid channel, such as sample inlet channel 120, such that fluid flows into and out of the cavity 620. It should be understood that this cavity 620 may be a two-dimensional widening of the channel in the expanding region, and narrowing of the channel in the contracting region. This shape of geometry is shown schematically in FIG. 9.

The variable cross section focusing channel 600 may be used instead of the curved focusing channel 300 shown in FIG. 8. That is, the variable cross section focusing channel 600 may be used in place of the z-focusing curve 330, or in place of the entire focusing element 300. The variable cross section focusing element 600 may be disposed upstream of the moveable member sorting device 110.

The cavity 620 may have a length of L, which may be the distance between the expanding and contracting portions. More particularly, the variable cross section portion, cavity 620, may have an expanding region 625 and a contracting region 627 disposed over a distance L with a high point 623 between them. The high point 623 may be the point of maximum lateral extent of the channel 600, that is, the portion of widest channel width. As shown in FIG. 9, the variable cross section focusing channel 600 may include a plurality of expanding and contracting regions, such as 620 and 620' shown in FIG. 9. The expanding and contracting regions may be arranged in different ways with respect to a turn that is made by the channel as it directs the sample fluid from the sample input 310 to the valve mechanism 100 or 110.

Because of this shape, and expanding region 625 followed by a contracting region 627, the variable cross section focusing channel 600 may encourage various eddies, motions and hydrodynamic forces within the focusing element.

FIG. 9 illustrates quantities that will used to discuss the various design parameters and their resulting hydrodynamic behaviors in further detail below. H is the height of the variable cross section portion cavity, and L is the length of the cavity portion. W is the nominal width of the sample inlet channel 120 (channel without the expanding and contracting cavities). H/W is the aspect ratio of the variable cross section cavity portion with respect to the nominal channel width. The pitch P is the distance between one cavity 620 and a subsequent cavity 620'.

Figure 10:
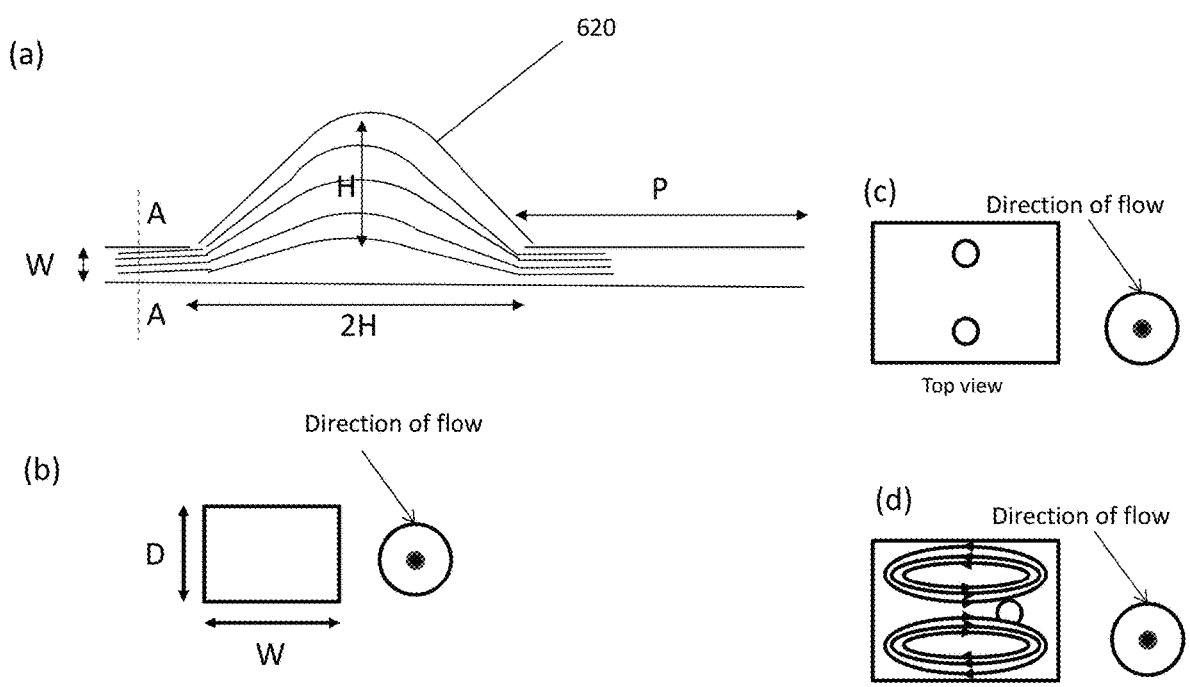
FIG. 10 is simplified schematic diagram of the forces operating in the novel variable cross section focusing channel; (a) shows the contours of the device and the streamlines therein; (b) shows the cross sectional dimensions and the flow direction; (c) shows the stable regions in the flow; and (d) shows the hydrodynamic forces acting on the particles.

As mentioned previously, various hydrodynamic effects may result from this variable cross section geometry, and these are illustrated in FIG. 10. These effects may result in a geometry induced secondary flow focusing. Particles experience two forces in the flow. The first may be an inertial lift force, which is a combination of shear gradient lift resulting from the flow profile parabolic nature, and wall lift force. In addition, the particles may experience Dean flow drag: which is the drag force exerted on the particle as a result of the secondary dean flow induced by curved streamlines. It is possible to balance these two forces by proper selection of the geometrical parameters of height, size, aspect ratio and placement. Accordingly, these two forces may be balanced by introduction of the expansion-contraction cavities 620 of a particular size, shape and distribution, in the variable cross section element 600. The combination of geometrical parameters determines whether there is a balance between these forces or not and where in the channel are the equilibrium nodes or points where the net force on the particles is zero.

As a result of these balanced forces, particles may be focused in one position within the channel using the cavities 620, 620' shown in FIG. 9, as the particles are brought to a two dimensional focused state.

FIG. 10 is simplified schematic diagram of the forces operating in the novel variable cross section focusing channel; (a) shows the contours of the device and the streamlines therein; (b) shows the cross sectional dimensions and the flow direction; (c) shows the stable regions (equilibrium nodes) in the flow channel without cavities; and (d) shows the hydrodynamic forces acting on the particles as a result of curved streamlines in the cavities;

As shown in FIG. 10 (a), the cavities 620 in focusing element 600 are generally triangular cavities with a height of H and a base of 2H. In other words, the cavities may be two adjacently placed equilateral triangles. The width, W, of the nominal channel before and after the cavities 620 and 620', is used as a scale factor, to parametrize the quantities as discussed below. The apex of the triangle may be smoothed to discourage bubbles becoming trapped at the apex.

The cross section of the channel is shown in (b) along with the flow direction in the channel. The inertial focusing effects are shown in FIG. 10(c). An equilibrium position exists for particles in a straight channel with the same non-varying cross section. The expansion-contraction cavities create an out of plane secondary flow (dean flow) which balances the inertial drag force and changes the equilibrium nodes, as shown in (d). Accordingly, an equilibrium position for the particles will exist as shown in FIG. 10, as shown in (c).

Alternatively, the focusing element may be an acoustic focusing structure. Such a structure is shown in FIG. 11*a, b*. FIG. 11*a* shows an acoustic focusing structure which is achieved by actuating the PZT acoustic transducer element 700 seated under, for example, the sample inlet channel 120 on the microfabricated particle manipulation device 100. The PZT element 700 may be operating at its resonant frequency. The resonating PZT may launch a bulk acoustic pressure wave 710 into the microfluidic channel 120, as is shown in FIG. 11*b*. This acoustic pressure wave 710 may drive the particles 5 suspended in the flow to the low pressure node in the center of the channel 120.

But in any case, because the focusing element tends to herd the particles into a well-defined portion of the sample stream, the uncertainty in gate timing and particle trajectory may be reduced. Accordingly, a multisort system such as described above may be an ideal application for the particle focusing structures described above, because it can make use of the predictable fluid trajectory of the target particles.

Figure 12:
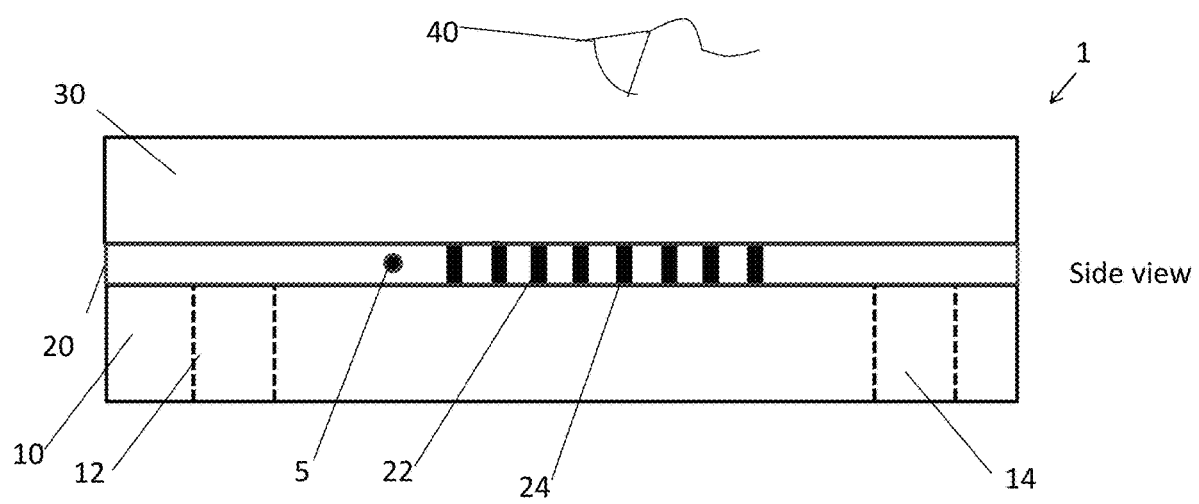
FIG. 12 is a cross sectional view of a microfabricated particle filter that may be used with the microfabricated particle manipulation device described here.

A filter element may be added for the purpose of retaining undesired particles, and placed upstream of the hydrodynamic focusing elements and the movable member 110 of the valve. FIG. 12 shows one such device, with parallel filter elements to allow more filter area and also robustness to filter clogging.

Figure 18:
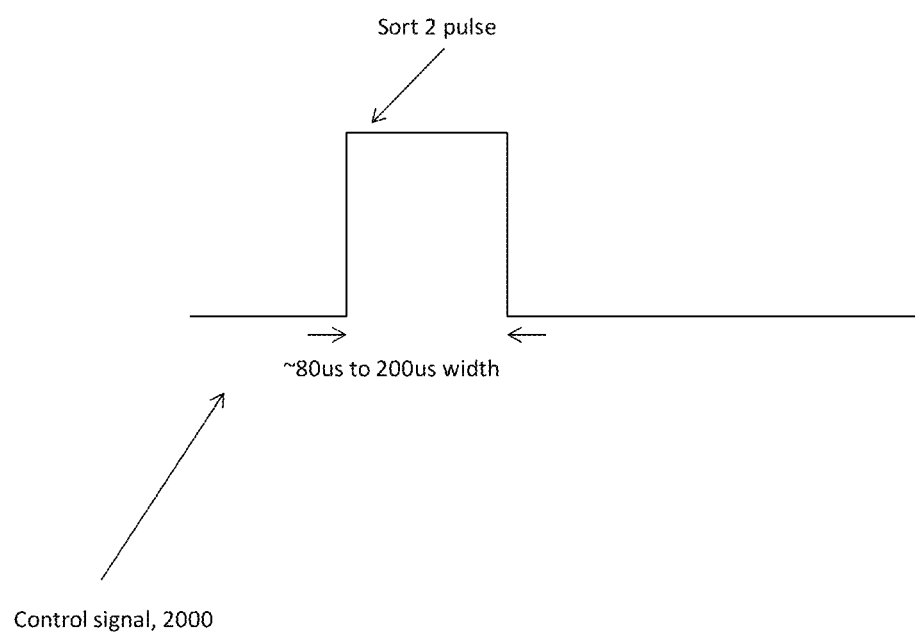
FIG. 18 is an exemplary excitation profile for electromagnet for sorting into the first sort channel.
Figure 19:
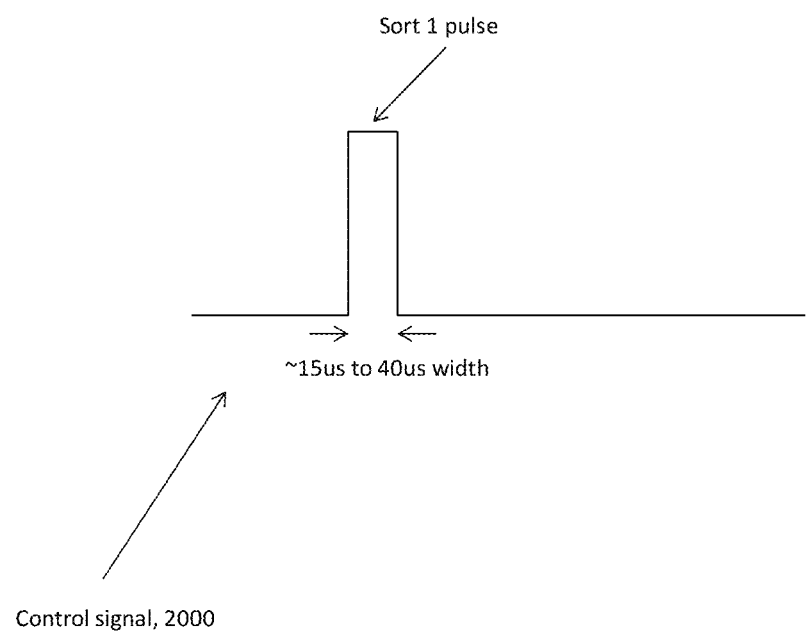
FIG. 19 is an exemplary excitation profile for electromagnet for sorting into the first sort channel.

FIG. 12 is a cross sectional illustration of a microfabricated filter. The filter may be used in, for example, a cell sorting system as described below. In FIG. 12, a sample stream may include at least one debris particle 5, suspended therein. The sample stream may be admitted to the filter structure 1 through an inlet channel 12, from which it may flow laterally across the face of the substrate 10 as shown by the arrows in FIG. 13. The flow may traverse a series of filter barriers 22, 24 which are arranged so as not to seal the channel to the flow of the sample stream, but to trap particles of a particular size which may be suspended in the sample stream. In FIGS. 18 and 19, these filter barriers may be disposed in a staggered arrangement across the width of the channel. However, no barriers extend entirely across the channel so as to seal it against the flow. Instead, the sample stream may flow between the staggered barriers 22 and 24 which may be separated by a distance d. Accordingly, particulate debris with a dimension greater than d may be trapped in the filter 1.

As shown in FIG. 12, the microfabricated channel with filter barriers 22, 24 may be sealed on top by another layer or substrate 30. This layer or substrate 30 may be optically transparent, allowing radiation to pass through and impinge upon the trapped particle 5. The transparent layer 30 may comprise at least one of quartz, sapphire, zirconium, ceramic, and glass. The transparent layer 30 may allow analysis and characterization of the particulate debris found in the sample stream. Such information may be important in identifying and correcting the source of the contamination. FIG. 12 shows evaluation of trapped particle 5 by an analysis unit 40, such as a microscope or spectrometer. The analysis technique may include investigation of specular, diffractive, refractive behaviors of the particle 5, for example. Accordingly, the filter system may include an optical microscope which is disposed adjacent to the filter and is configured to image the particulates intercepted by the plurality of barriers, through the transparent layer 30. Alternatively, the analysis tool may be a spectrometer which is disposed adjacent to the filter and is configured to analyze the particulates intercepted by the plurality of barriers, through the transparent layer. In other embodiments, x-ray diffraction, crystallography, or other methods may be used to analyze the trapped debris through the transparently layer 30.

Figure 13:
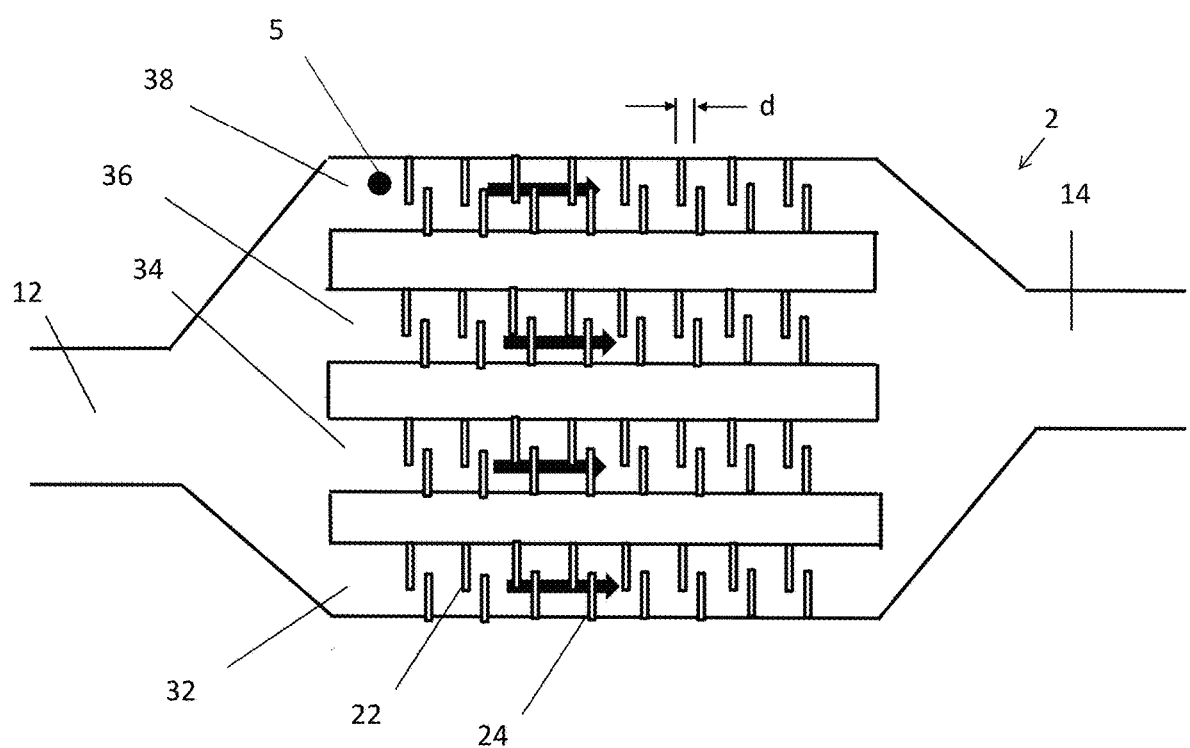
FIG. 13 is a plan view of a microfabricated particle filter that may be used with the microfabricated particle manipulation device described here.

FIG. 13 is a plan view of the microfabricated filter 2. FIG. 13 shows effectively the staggered arrangement of the filter barriers 22 and 24. In one embodiment, each filter barrier 22 extends less than the full diameter, but more than one-half of the diameter of the channel. Accordingly, by staggering pairs of like filter barriers 22, 24 one behind the other, the channel remains open to the passing of the sample stream but will trap particles of debris with a dimension larger than the distance between the barriers. In other embodiments, the filter barriers 22, 24 may extend less than ½ the distance across the channel, such that the fluid may flow between the barriers but particulate debris may not. Accordingly, in some embodiments, at least one of the plurality of barriers has a rectangular shape, and there is a varying distance between opposing barriers.

The plan view of FIG. 13 shows a plurality of parallel paths 32, 34, 36 and 38 each with filter barriers 24, 26. It should be understood that although the paths 32, 34, 36 and 38 may have the same shape of filter barriers 24, 26 as shown, or they may be different. In some embodiments, the filter barriers may be the same in the parallel paths 32, 34, 36 and 38. In other embodiments, the filter barriers may be different. The paths are shown as being in parallel, but this is also exemplary only, and some filter barrier shapes 32, 34, 36 and 38 may be placed serially before or after other filter barrier shapes. It should be appreciated that since the filter barriers are fabricated lithographically, the shapes may be made arbitrarily complex.

The sample stream may again be input to the filter 2 through an input channel 12, from which it may flow laterally across the face of the substrate 10 as shown by the arrows in. 32-38. The flow may traverse a series of filter barriers 22, 24 in each of the channels 3-38, which are arranged so as not to seal the channel to the flow of the sample stream, but to trap particles of a particular size which may be suspended in the sample stream. In channels 32-38, these filter barriers may be disposed in a staggered arrangement across the width of the channel. However, no barriers extend entirely across the channel so as to seal it against the flow. Instead, the sample stream may flow between the staggered barriers 22 and 24 which may be separated by a distance d. Accordingly, particulate debris with a dimension greater than d may be trapped in the filter barriers 22, 24.

In channels 32-38, the filter barriers may be simple rectangles, similar to filter barriers 22, 24 in FIGS. 12 and 13. In other embodiments, the barriers may have different shapes, such as a tapered shape, narrowing from base to tip, triangular or sawtooth. The filter barriers 34 may lean into or away from the flow. The different shapes and orientations may have different behaviors in terms of effectiveness in trapping particles. Each type of filter shape creates a specific flow circulation around it which traps particles based on their characteristics such as the relative rigidity or stiffness of the particle, or how round or rod-shaped a particle is.

Because of the effective focusing apparatus of FIGS. 8-11 and filter element of FIGS. 12-13, the particles may arrive at the sorter 100 free of debris or contaminants, and in a tightly confined streamline in a particular portion of the microchannel 120. In effect, because the particles are in a well-defined portion of the channel and with a well-defined velocity, some unusual sort strategies may be brought to bear on the particles within the system. In particular, it is possible that a plurality of sort output paths may be provided, and each target particle may be directed into one of the plurality of sort output paths. The details of the current pulse delivered to the electromagnetic actuation means may determine which of a plurality of sort output paths the trajectory of the particle takes. One embodiment of such a multi-channel sorting valve ("multisort valve"), that is, a microfabricated particle sorting valve having a plurality of sort output channels, is described below. In other words, in addition to a waste channel for non-target material and a sort channel for target particles, the target particle may be directed into one of a plurality of sort output channels.

Figure 14:
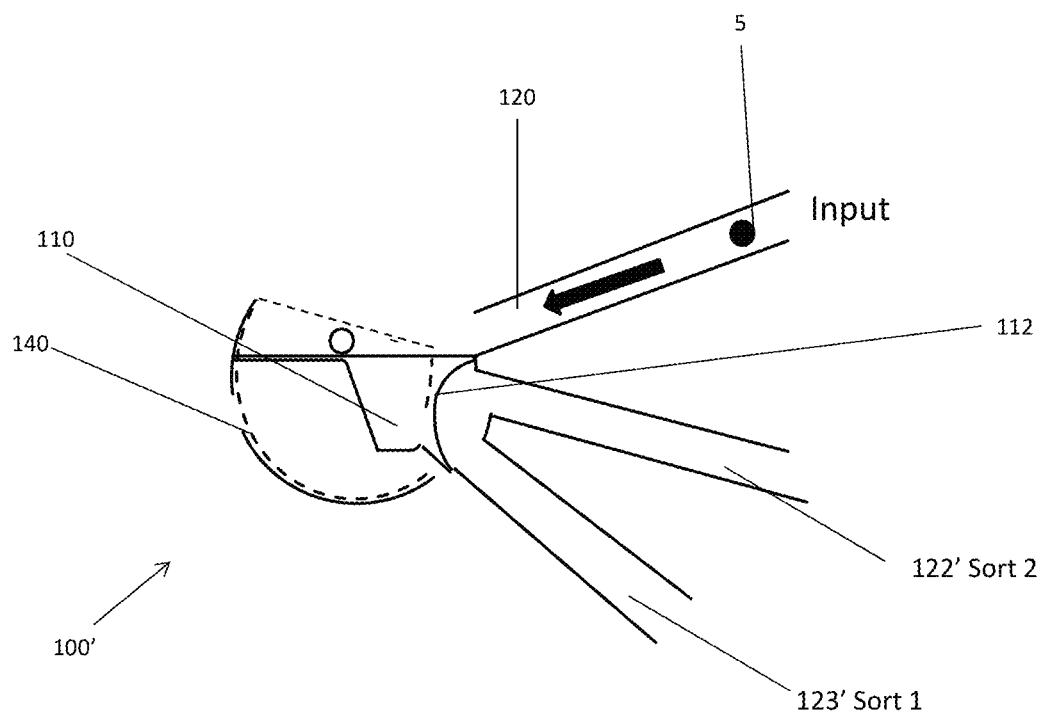
FIG. 14 is a simplified illustrative view of a plural sort valve in a first waste position.

FIG. 14 is a schematic illustration of a particle manipulation device 100' which is adapted for the multisort embodiment. Particle manipulation device 100' may be similar to particle manipulation device 100 in that is has a sample input channel 120, leading to a movable member 110 which is the sorting device, and a waste channel 140 which flows generally orthogonally to the sample input channel 120, and orthogonal to the plane of motion of the movable member 110. More particularly, the waste channel 140 may be into the plane of the paper, and generally orthogonal to that plane.

However, in contrast to particle manipulation device 100, particle manipulation device 100' may have a plurality of sort output channels, all may be generally in the plane of the substrate. Shown in FIG. 14 is sort channel 123' which is henceforth referred to as sort channel 1, and sort output channel 122' which is henceforth referred to as sort channel 2. Comparison of FIG. 14 with FIG. 2 reveals that sort channel 122' is largely similar in size and location to sort channel 122. The new sort channel 123' may be located below sort channel 2 122', and may form a larger angle (generally around 60 degrees) to sample input channel 120. Sort channel 2 122' may, as before, form an angle of about 45 degrees to the sample input channel 120.

Accordingly, upon entering the sort device 100 and movable member 110' a target particle 5 may flow into one of a plurality of sort output channels, depending on the results of the laser interrogation and the current pulse applied to the movable member 110' via the electromagnetic actuator 500.

It should be understood that the embodiment shown in FIG. 14 is exemplary only, and that the concepts here can be extended to any number of sort channels in addition to a first sort output channel, which may be disposed at other angles with respect to the first sort output channel.

As before, the particles may be identified based on a fluorescent signal detected in the laser interrogation region 101. Depending on the identity of the particle, the decision can be made whether to direct it into sort channel 1 (123'), or sort channel 2 (122'), or to let it flow into the waste channel 140. Depending on the outcome of the interrogation, the particle can be directed into the proper path by the choice of the details of the sort pulse applied to the electromagnet 500, as will be described further below.

An important parameter in making the multisort device 100' work properly may be the ratio of fluidic resistance in sort channel 1 compared to fluidic resistance of sort channel 2. In particular, sort channel 1 may be low-resistance path compared to sort channel 2. In other words, sort channel 2 (the nominal "ordinary") sort channel may have high fluidic resistance compared to sort channel 1.

Figure 15:
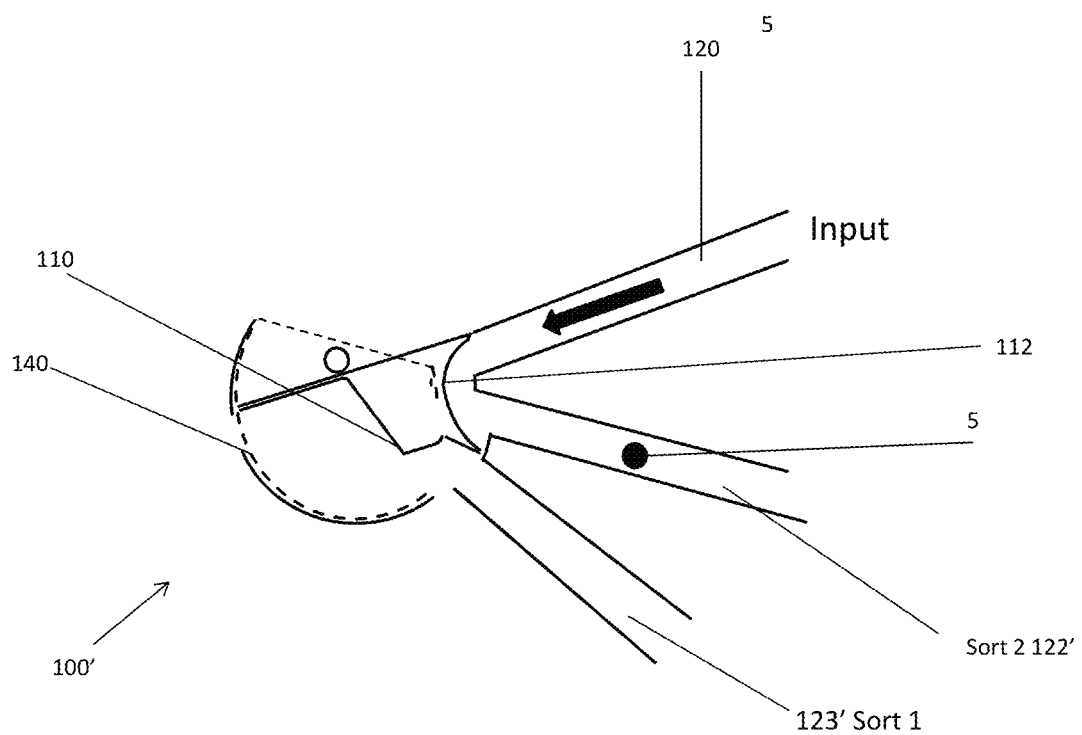
FIG. 15 is a simplified illustrative view of a plural sort valve in a second sort position using long solenoid hold operation.

In the waste position depicted in FIG. 14, the valve is not actuated and the sample stream flows directly into the waste channel 140. Then, for sorting into sort channel 2, the electromagnet 500 may use a standard sort signal which may be relatively long, on the order 200 microseconds. In this period, sort channel 2 may be the only path available during the long sort pulse. Accordingly, the target particle 5 may flow into sort channel 2 if the gate is held in the position shown in FIG. 15 for a sufficiently long time. If there is no actuation at all, of course the particle will flow into the waste path and waste orifice 140.

In other words, if the solenoid, and thus the gate or valve is held down for a relatively long time, the target particle may be forced down the only open path, into sort channel 2, despite it's relatively high fluid resistance. With the valve in the position of FIG. 14, the actuator cuts off flow to sort channel 1, and particles can only go to sort channel 2. Particles flowing in sort channel 2 will continue out of chip into a sort reservoir.

Figure 16:
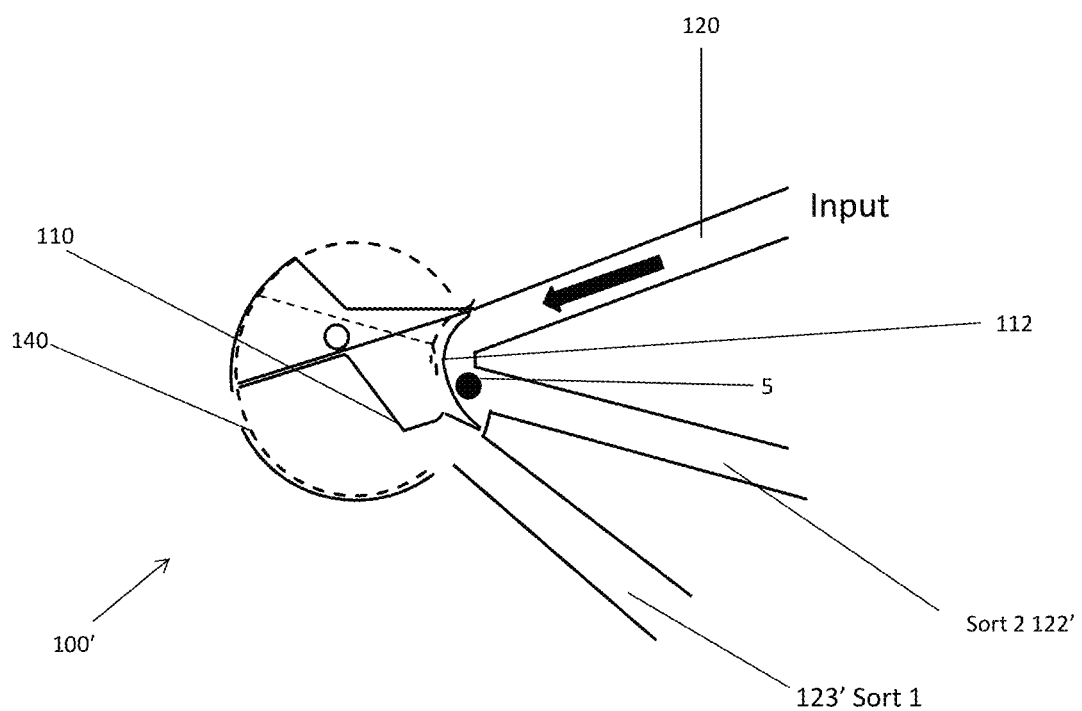
FIG. 16 is a simplified illustrative view of a plural sort valve in a second sort position using a normal (short) solenoid hold actuation.
Figure 17:
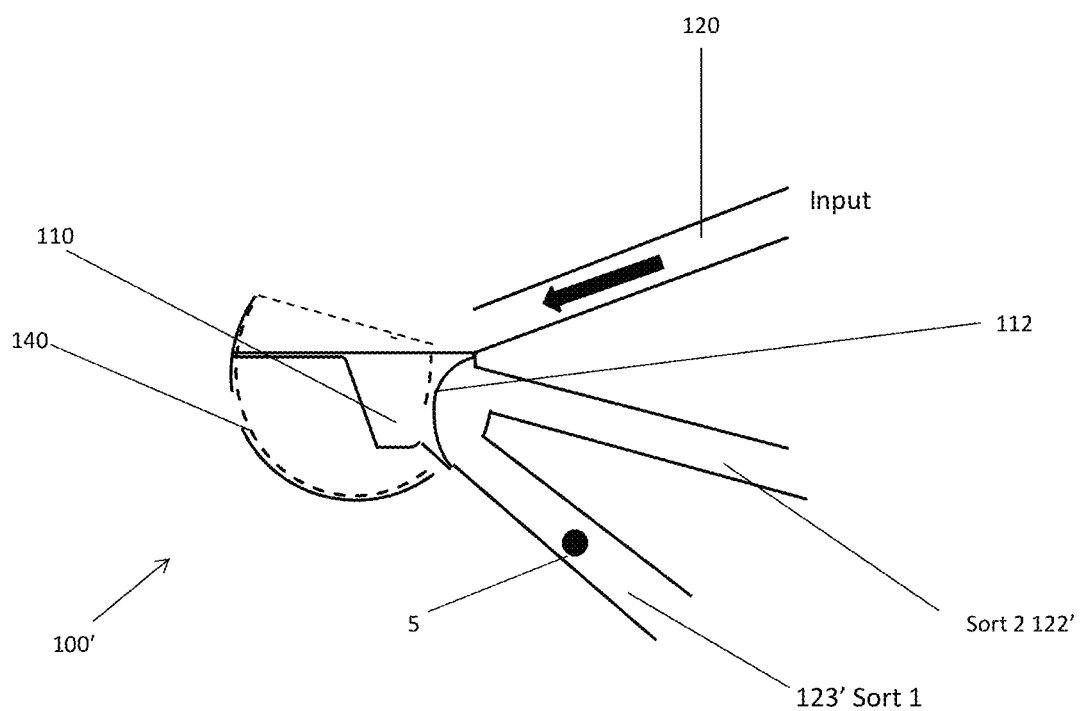
FIG. 17 is a simplified illustrative view of a plural sort valve in a second sort position using a normal (short) solenoid hold actuation.

In contrast, in FIG. 16, the scenario is shown schematically of sorting the target particle 5 into sort channel 1, using a relatively short gate sort signal. During this short gate, sorted particle enters the area between sort channel 1 and sort channel 2 (see FIG. 16). But before the particle is forced into sort channel 2, actuator is released and the particle flows into the lower fluidic resistance path, sort channel 1 (see now FIG. 17). The movement of the movable member 110' may assist in moving the particle 5 along this lower path, as when the actuator relaxes, it is pulled downward by the restoring spring discussed above. Particles flowing in sort channel 1 will continue out of chip to another sort reservoir.

FIG. 18 is a qualitative illustration of the control signal/waveform which may be delivered to the electromagnetic device 500 to accomplish the sort into sort channel 2. As described above, the sort gate waveform may have a relatively long duration, between about 80 to about 200 microseconds. During this period, the only path available is from the sample inlet channel 120 into the sort channel 2. This duration is sufficient to cause the particle to overcome the fluidic resistance of sort channel 2, because there are no other paths open to it.

In contrast, FIG. 19 is a qualitative illustration of the control signal/waveform which may be delivered to the electromagnetic device 500 to accomplish the sort into sort channel 1. As described above, the sort gate waveform has a relatively short duration, between about 15 to about 40 microseconds. This duration is insufficient to cause the particle to overcome the fluidic resistance of sort channel 2, and instead it flows into sort channel 1 at the end of the 15-40 microsecond pulse.

Figure 20:
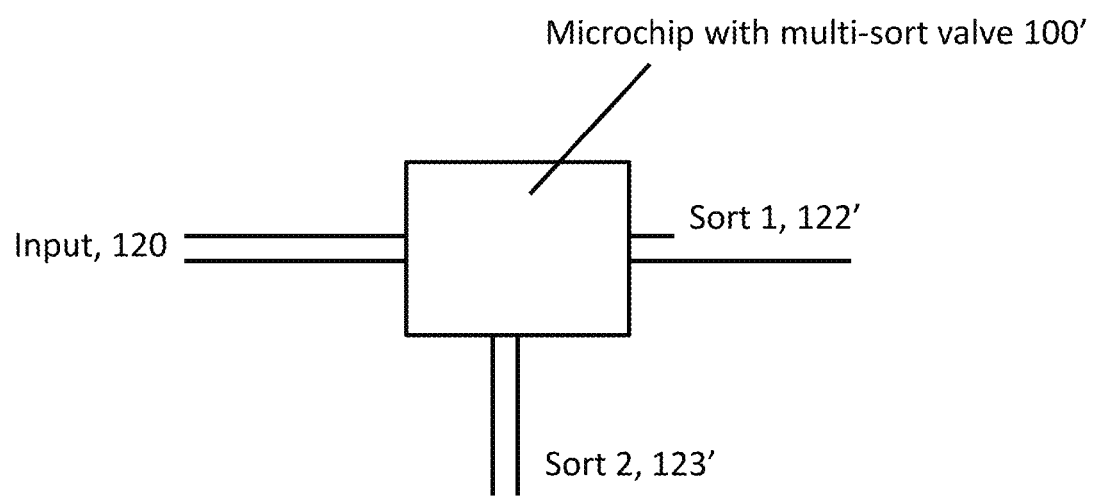
FIG. 20 is a schematic of general sorting into multiple channels.

FIG. 20 shows a first embodiment of a system using the multisort valve 100'. This figure is schematic only, and lacks many of the details illustrated in FIGS. 14-17. FIG. 20 is intended to illustrate, in general, the distinguishing concepts in this invention, without the details ascribed to a particular embodiment. In particular, sort valve 100' may have a plurality of sort output channels, or at least two sort output channels 122' and 123'. Which of the plurality of sort output channels is invoked may depend on the features of the waveform driving the sort gate or sort valve 100'.

In this schematic illustration, as before, the sample stream is input to the multisort valve 100' by the sample input channel 120. From the sample channel, the target particle 5 may flow into either the sort channel 2, 122' or sort channel 1, 123'. Which of the paths it takes may depend on the results of the laser interrogation and the shape and/or duration of the pulse delivered to the electromagnet 500. One type of pulse shape, for example, is a long pulse is likely to send the particle 5 into sort channel 2 122'. Another, different shape of pulse, for example, is a shorter duration pulse is more likely to send the target particle into sort channel 1, 123'.

Figure 21:
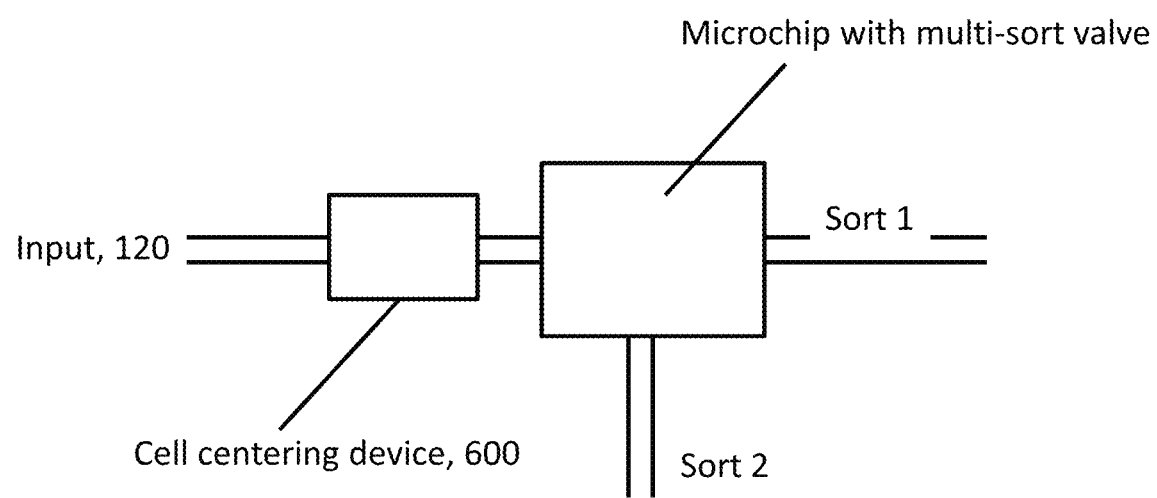
FIG. 21 is schematic of general sorting into multiple channels with cell-centering in input.

In another embodiment shown in FIG. 21, the multisort valve 100' is combined with a focusing element which tends to urge the particle into a particular streamline of the flow channel. One such focusing element may be the variable cross section focusing element 600, discussed above. However, the focusing element may alternatively be any other sort, such as the z-focus channel. Alternatively, the focusing element may be an acoustic focusing structure. But in any case, because the focusing element tends to herd the particles into a well-defined portion of the sample stream, the uncertainty in gate timing and particle trajectory may be reduced. Accordingly, a multisort system such as described above may be an ideal application for the particle focusing structures described above, because it can make use of the predictable fluid trajectory of the target particles.

FIGS. 22-27 depict another exemplary embodiment of the focusing structure which focuses the suspended particles into a portion, for example a particular quadrant, of the cross section of the fluid channel.

Figure 22:
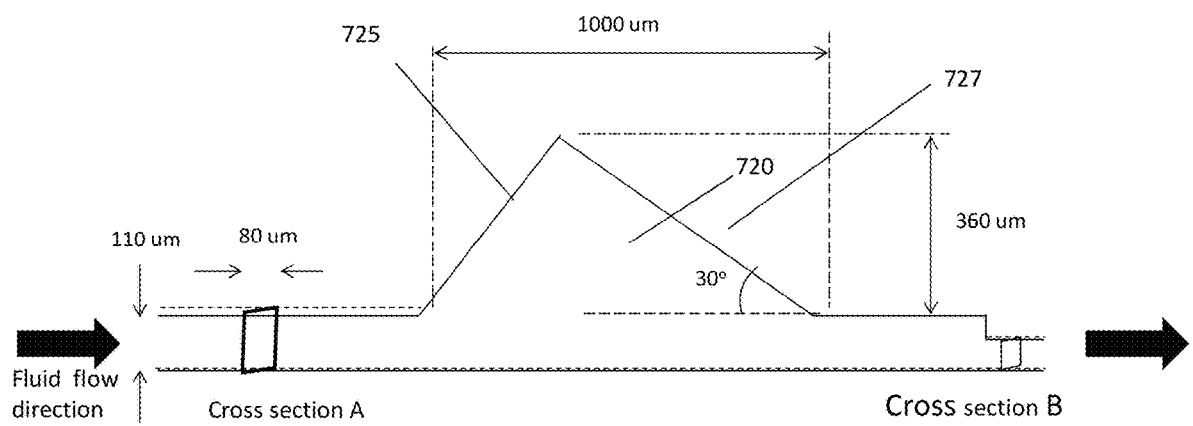
FIG. 22 is a simplified schematic diagram for triangularly shaped cavity.

FIG. 22 is a simplified schematic diagram of a fluid path with a variable cross-section. In this embodiment, the shaped cavities 620 which were shown in FIGS. 9 and 10 in this embodiment, have a triangular shape 720 as shown in FIG. 22. Because of the asymmetry of this triangular shape, these cavities may cause a more effective focusing forces that concentrate particles within the flow.

In the embodiment shown in FIG. 22, the triangular cavity 720 may have a 60° angle with respect to the incoming streamline, and a 30° angle with respect to the outgoing streamline. These angles are as defined in FIG. 22, which shows that the first-encountered wall 725 may form an angle of about 60 degrees with respect to the parallel, horizontal wall of the flow channel. The second-encountered wall 727 may form an angle of about 30 degrees with respect to the parallel, horizontal wall of the flow channel. The third angle in the triangle is, of course, 90°.

Figures 24, 24A, 24B:
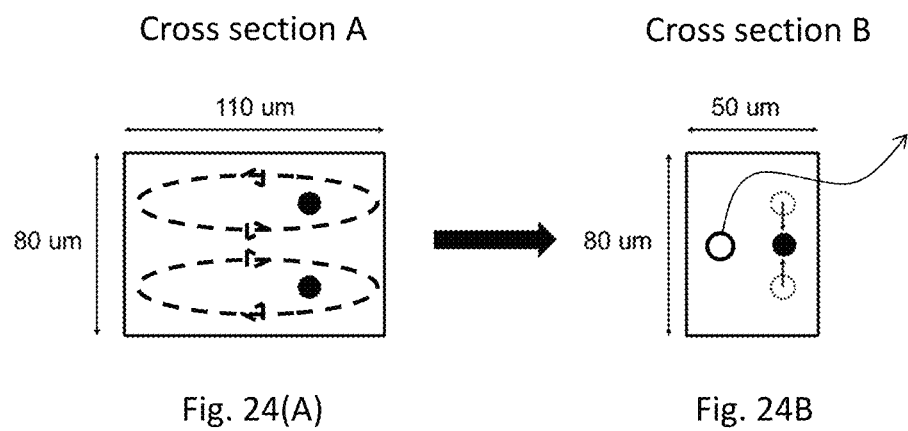
FIG. 24 is a simplified schematic illustration of the dean flow forces focusing particles in a specific area of the flow channel.
FIG. 24(A) shows cross section A and FIG. 24(B) shows cross section B.

The relatively wide entrance angle to the triangular region 720 may enforce pronounced Dean flow forces in this region, focusing particles as described above. The gentler 30 degree exit angle may urge the particles into their new stable positions. The series of triangular regions 720 may enforce this behavior again and again, until the stable positions shown in FIG. 24A are reached.

The pitch between the triangular cavities may be about 2 mm. The height of each triangular cavity as defined in FIG. 22, maybe about 360 µm. The total length of the triangular cavity may be on the order of about 1000 µm, or 1 mm. It should be understood that these dimensions are exemplary only.

The incoming fluid channel may have a channel height of about 110 µm, as shown in the figure. The depth of this channel may be about 80 µm. This channel cross-section is maintained throughout the input to the triangle. Upon encountering the triangular cavity 760, the 110 micron dimension expands dramatically, whereas the 80 micron depth is maintained, as further described below.

The 80 µm dimension may pertain to the depth of the channel, that is, the depth of the channel in the dimension into the paper. A perspective view of the flow channel also appears in FIG. 22. This 80 µm depth is maintained throughout the triangular cavity. In contrast, the 110 µm channel height varies from 110 µm at the entrance to a height of (360+110) µm at the apex of the triangular cavity 760, before descending again to 110 µm at the output of the triangular cavity 760. The curvature imparted to the streamlines by the existence of this cavity generates the dean flow which provides the focusing force as described previously.

Figure 23:
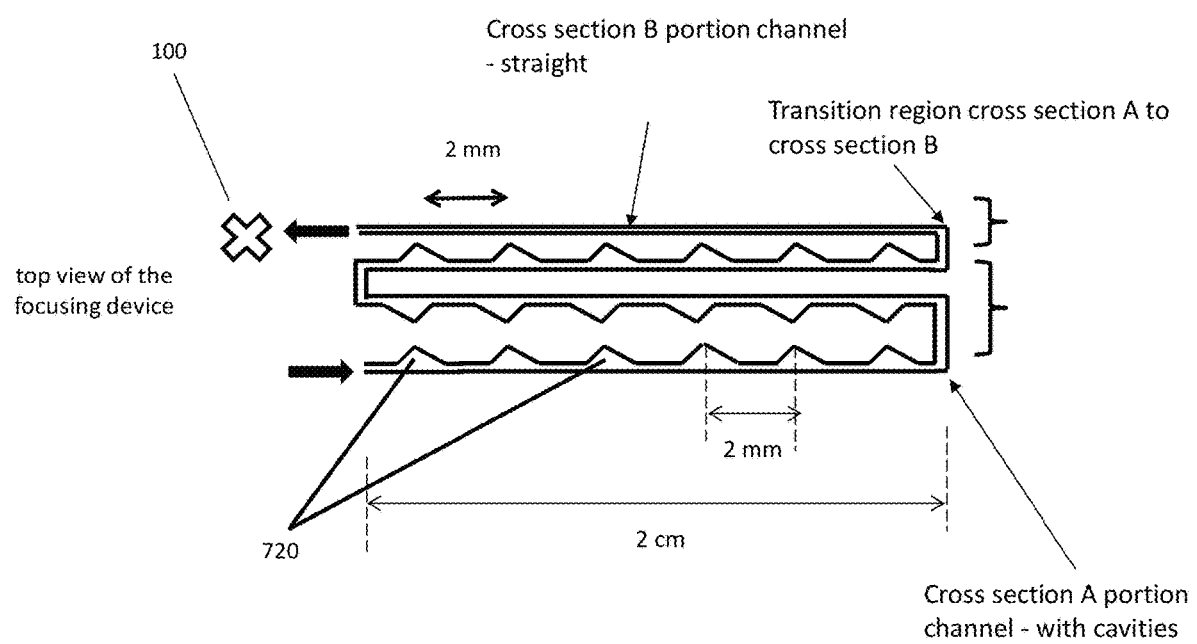
FIG. 23 is a simplified schematic diagram of a fluid path containing a plurality of triangularly shaped cavities.

FIG. 23 is a simplified schematic illustration of the flow channel from a zoomed out perspective. FIG. 23 shows a plurality of triangular cavities disposed in the fluid path. It should be understood, that this diagram is not to scale, and the details may be altered for ease of illustration. In particular whereas FIG. 23 shows only about 18 triangles cavities, there may in fact be many more, for example 50 or even 75 triangular cavities in the flow path.

There may also be a transition region shown in FIG. 22, wherein the shape of the flow channel changes abruptly. In this transition region, the cross sectional shape of the flow channel may transition from shape "A" to shape "B". The difference between the cross section A and cross section B is that the aspect ratio (AR=height divided by depth) changes from AR>1 to AR<1. In cross section A, the aspect ratio is 110/80=1.375, whereas in cross section B, the aspect ratio is 50/80=0.625. The effect of this transition is described below.

It should be understood that these dimensions and the ratios between them are exemplary only. More generally, the channel height may bt, for example, between 50 um and 500 um, and the channel width may be between about 30 um and about 120 um. Accordingly, the aspect ratio in the "tall" segment (AR>!) may simply have an aspect ratio greater than 1 (for example, between 1+ and 50), and the aspect ratio in the "wide" segment may simply have an aspect ratio less than 1 (for example, between 0.4 and 1−).

Because the dean flow forces take some time to urge the particles into the desired portion of the fluid channel, a substantial length of fluid path may be required to accomplish the focusing. In some embodiments, the total path length may be on the order of, for example, 8 cm or more. In view of this length, it may be advantageous to fold the fluid path in order to make the device more compact. FIG. 23 shows six such turns, which gives a fluid path a serpentine shape. It should be understood that the path may be much longer with more turns. However, the features may not be drawn to scale because the details are impossible to render on the much larger scale of this 8 cm fluid path. Over this 8 cm distance, the particles in the fluid stream may be strongly focused into a single quadrant of the cross section. The location of the microfabricated fluid valve 100 is shown schematically in FIG. 23, but again, the details of the valve 100 are not rendered. Experimental data is presented in FIG. 25.

In some embodiments, a relatively large number of triangular cavities 760 is used, each having a shape general as depicted in FIG. 22. In one embodiment, 30-70 cavities are used, or more specifically on the order of 50 triangular cavities 760 may be used. With a pitch of 2 mm between the cavities 760, it is apparent that the total channel length may be about 8-10 cm long. In view of these numbers, it should be appreciated that the features depicted in FIG. 22 are not to scale. In fact, the triangular cavities 760 are smaller and more numerous than shown in FIG. 22, but for clarity of depiction and to keep the size of the drawing manageable, they are presented as shown in FIG. 22.

As mentioned earlier, another important detail in this design, is the change of aspect ratio of the cross-section of this fluidic path. As mentioned, at the input to the segment of the path containing the triangular cavities, the cross-section of the flow channel may be 110 µm×80 µm=1.375. The 110 µm dimension is variable because of the presence of these triangular cavities. However the 80 µm dimension is maintained throughout. As a result the aspect ratio of this portion of the flow channel, aspect ratio being defined as the height divided by the depth, maybe greater than one. In particular the aspect ratio of this flow channel may be 110/80=1.375 at the input, and increasing to almost 6 at the apex, before returning to 1.375 at the exit of the cavity. before encountering the transition region shown in FIG. 22.

After approximately 40-70 triangular cavities in the flow path, the flow may encounter the transition region shown in FIG. 22. As shown, this transition region may be located after the last triangular cavity 720 is encountered. In the embodiment shown in FIG. 23, this occurs at the fifth or the sixth turn in the fluid path, and after about 50 triangular cavities have focused the particles into either of two stationary positions exiting in the flow path, as described next.

This length of fluid path, with aspect ratio 1.375, will result in a focusing of the particles in a particular portion of the fluid channel. In particular, the particles may be arranged in two points along the depth dimension. That is, across the 80 µm depths of this flow channel there may exist to concentrated areas where the target particles are urged. This behavior is driven by the Dean flow forces existing in the curved channel with the aspect ratio being greater than one. If this aspect ratio is suddenly changed to a value less than one, the effect will be to urge the target particles into two new, and different paths plus spots with respect to the short dimension of the aspect ratio short dimension of the channel.

This behavior is illustrated by FIG. 24. In FIG. 24, the cross-sectional shape A corresponds to the aspect ratio of 110/80=1.375, that is, and aspect ratio greater than one. As illustrated in the figure, the result of this fluid channel shape is to concentrate the particles in two stable locations in the right hand side of the long dimension, or in other words, two positions occur along the short (depth) dimension of the flow channel.

Also illustrated in FIG. 24 is the effect of a sudden change in the aspect ratio, in particular an aspect ratio less than one, such that the channel is deeper than it is tall. In this case, what was the long dimension becomes the short dimension, and the stable locations within the flow channel cross section shift. In FIG. 24 The cross-section B, what was the long dimension 110 is altered to become the short dimension 50 µm. Using the same definition for aspect ratio the aspect ratio of this cross-sectional channel B is now less than one. As a result, the particles are urged again into a two spots along the short dimension of the flow channel, which is now the height dimension, 50 microns. Or in other words, the particles tend to be focused in two spots along the long dimension, which is now the depth dimension 80 microns.

The effect of this change is therefore to suppress the second stable position that was formed in the AR>1 channel. That is, the AR>1 channel tends to focus particles on the right hand side of the channel, but the transition to cross section B suppresses the second stable position and encourage all the particle to flow in a single location of the right hand side of the channel. This effect is illustrated in (B) where the left hand stable position is effectively eliminated.

To further clarify, because the target particles were urged into two spaces with aspect ratio greater than one, but two different spaces with aspect ratio less than one, the effect is to undermine or suppress one of the stable positions of the particles as illustrated in FIG. 24B. In FIG. 24B, the left-hand locus of particles is effectively suppressed, leading only one locus in the flow channel, that being on the right side of the short dimension of the channel as illustrated in FIG. 24B.

Figure 25:
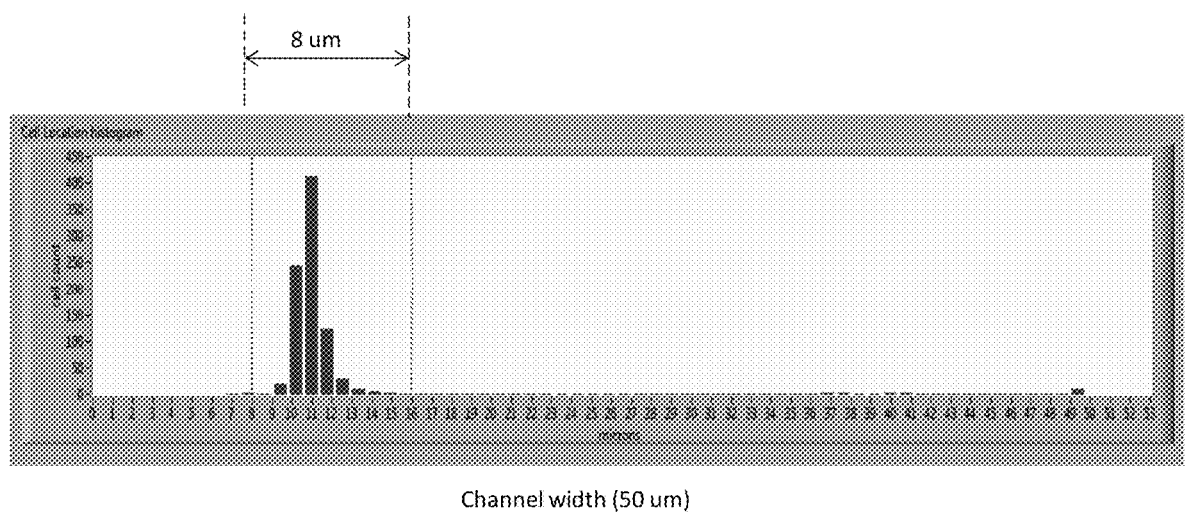
FIG. 25 is a histogram showing the particle count within a certain segment of the fluid path.
Figure 27:
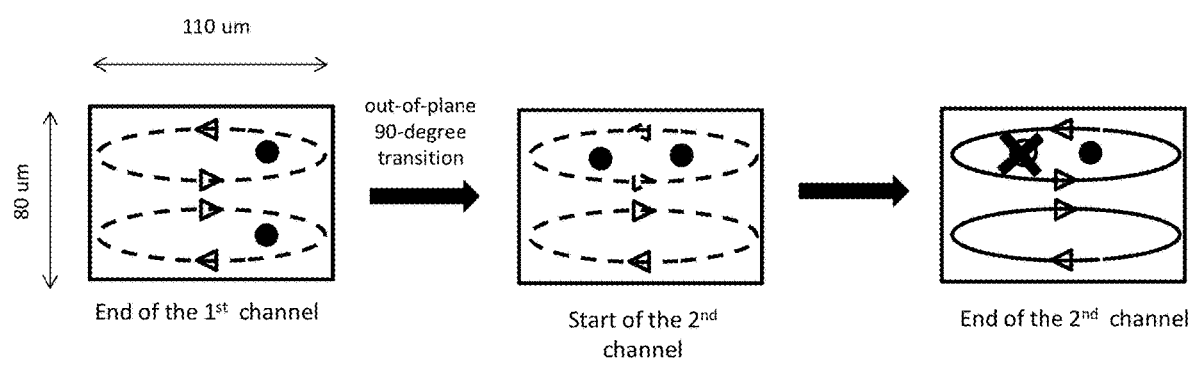
FIG. 27 is a simplified schematic illustration showing the dean flow forces forcing particles in a specific area of the flow channel, and the effect of the 90° out of plane turn.

FIG. 25 is experimental data showing the effectiveness of the flow path described in FIGS. 22 through 24. FIG. 25 is a histogram showing the location of the target particles within the flow channel. The flow channel is shown along the X axis in positions from 0 to 53 where are the channel dimension is 50 µm. Accordingly, this axis corresponds to positions along the height of the 50 micron high flow channel. The histogram shows a strong focusing effect of the particles flowing in the channel. In fact, 95% of the particles are found in a single 8 µm portion of the 50 µm flow channel. This suggest strong and effective focusing of the particles by the cavities in combination with the change of aspect ratio of the fluid path as illustrated in FIGS. 22-24.

Another way to shift the locations of the stable position within the flow channel, is to impose a 90° turn in the fluid path. This may provide an effect similar to the change in aspect ratio from AR>1 to AR<1, but in the orthogonal dimension. As such, the effect is difficult to render in a 2-dimensional drawing. Nonetheless, the novel flow path is depicted in FIG. 26. It should be understood that the dashed portions of the flow pass shown in FIG. 26B may lie under, over, or adjacent to their projection of the solid lines shown in FIG. 26 be. The flip house or section adjacent for ease of depiction.

FIG. 26 is similar to the flow path shown in FIG. 23, except for the presence of a 90° out of plane turn as indicated by the arrow. This turn is a result of flow in the vertical dimension through a through substrate via (TSV) formed between the substrates. This substrate connects a lower fluid path to an upper fluid path, as shown and described below.

FIG. 26A shows a side view of the focusing structure. In the side view of 26A, there is an inlet to the flow path which traverses a first pass flow channel, it then encounters of via which directs the fluid flow vertically to the second pass channel. It should be understood that the triangular cavities exist in both the first pass channel and the second pass channel, however they are not shown in the side view of the FIG. 26A, because they occur in the plane of the fluid path. It is this difficult to render in a two dimensional line drawing.

FIG. 26B shows a plan view of the novel channel, but because of the difficulty of the three-dimensional rendering, features that are actually above or below other features are shown as adjacent, but using dashed lines.

Just as was the case with the alteration of the aspect ratio in FIG. 23, the effect of the 90 degree path bend is to change the sense of which channel sidewall is the long dimension with respect to the plane of the triangular cavities 720. In FIG. 26B, the shift in dimension is clear. After a length of fluid flowing in the channel which is 110 µm×80 µm (aspect ratio greater than one) the particles are focus generally in the second half of the long dimension. Between the flow shown in FIG. 26A and the flow shown in FIG. 26B, a 90° out of plane turn occurs in the flow path. This has the effect of rotating the sense of which sidewall is the long side of fluid channel cross section. After this 90 degree out of plane bend, the particle will be rotated as indicated in FIG. 27B.

Because of the effect of the sequence of flow channels, the left-hand locus of particles is suppressed as shown in FIG. 27C. Accordingly, there remains a single locus of particles in the upper right quadrant of the flow channel shown in FIG. 27C.

Next is described a particle sorting system 1000 which may make use of the multisort valve 100' and the focusing element.

Figure 28:
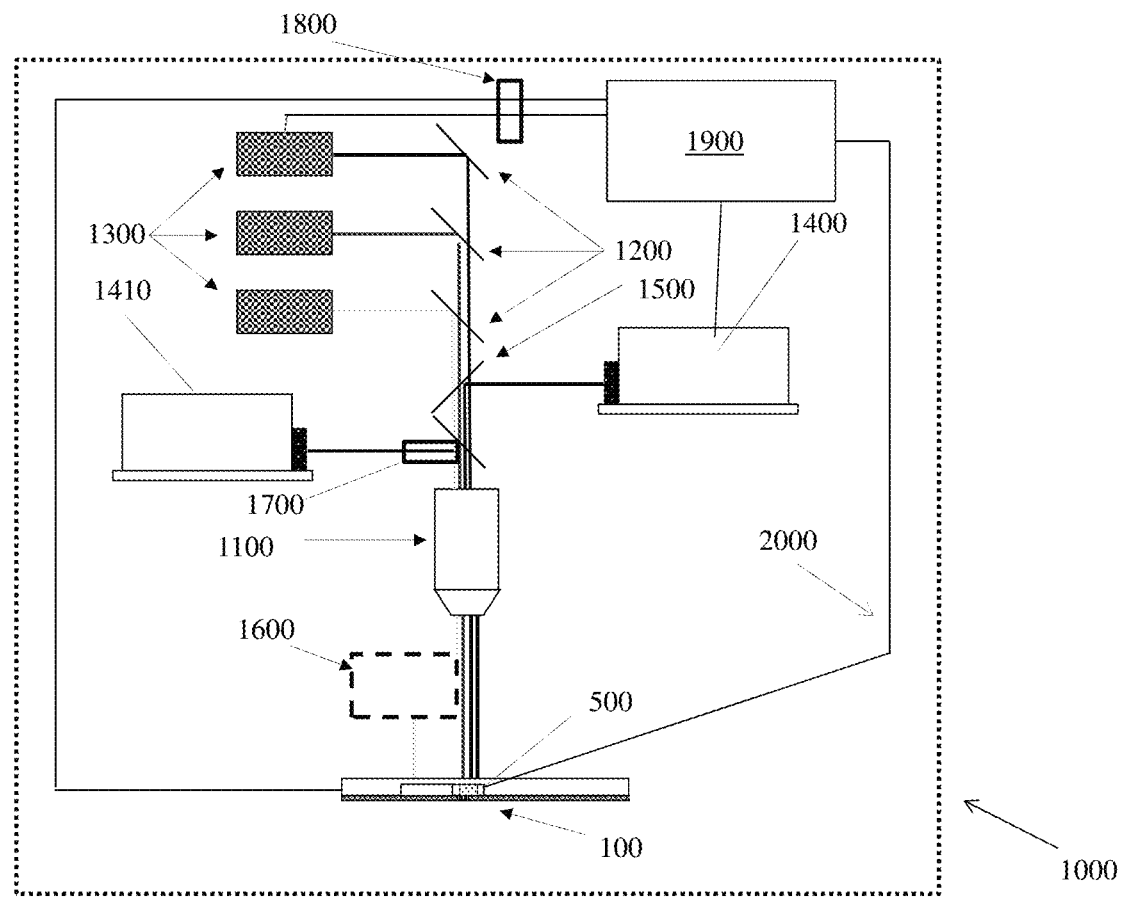
FIG. 28 is a system level view of the multisort valve included in a particle manipulation system.

The microfabricated particle manipulation device with multisort capability 100' with focusing element 600 may be used in a particle sorting system 1000 enclosed in a housing containing the components shown in FIG. 28. The MEMS particle manipulation devices 100', or 100 may be enclosed in a plastic, disposable cartridge which is inserted into the system 1000. The insertion area may be a movable stage with mechanisms available for fine positioning of the particle manipulation device 100', or 100 and associated microfluidic channels against one or more data, which orient and position the detection region and particle manipulation device 100', or 100 with respect to the collection optics 1100. If finer positioning is required, the stage may also be a translation stage, which adjusts the positioning based on observation of the location of the movable member 110 relative to a datum.

The focusing channel 600 may be formed on the chip or on the interposer as described in U.S. patent application Ser. No. 14/638,495, filed Mar. 4, 2015 and incorporated by reference in its entirety. Similarly, the filter structure 1 or 2 may be formed on the valve chip or the interposer. The interposer may be a plastic structure with channels formed therein, which translates the fluidic passages from the very narrow microfluidic passages formed lithographically on the MEMS substrate, to the macroscopic fluid reservoirs formed in the plastic, disposable cartridge.

It should be understood that although FIG. 28 shows a multisort particle sorting system 1000 which uses a plurality of laser sources 1400 and 1410, only a single laser may be required depending on the application. For the plurality of lasers shown in FIG. 28, one of the laser sources 1410 may be used with an associated set of parallel optics (not shown in FIG. 21) to illuminate the at least one additional laser interrogation region. This setup may be somewhat more complicated and expensive to arrange than a single laser system, but may have advantages in that the optical and detection paths may be separated for the different laser interrogation regions. For this embodiment, it may not be necessary to alter the trajectory, spectral content, timing or duration of the laser 1410 light. Although not shown explicitly in FIG. 28, it should be understood that the detection path for additional laser(s) 1410 may also be separate from the detection path for laser 1400. Accordingly, some embodiments of the particle sorting system 1000 may include a plurality of laser sources and a plurality of optical detection paths, whereas other embodiments may only use a single laser source 1400 and collection optics 1100. In the embodiment described here, a plurality of excitation lasers uses a common optical path, and the optical signals are separated electronically by the system shown in FIG. 28.

The embodiment shown in FIG. 28 is based on a FACS-type detection mechanism, wherein one or more lasers 1400, 1410 excites one or more fluorescent tags affixed to the target particles. The laser excitation may take place in multiple interrogation regions. The fluorescence emitted as a result are detected and the signal is fed to a computer 1900. The computer then generates a control signal that controls the electromagnet 500. It should be understood that other detection mechanisms may be used instead, including electrical, mechanical, chemical, or other effects that can distinguish target particles from non-target particles.

Accordingly, the MEMS particle sorting system 1000 shown in FIG. 28 may include a number of elements that may be helpful in implementing the additional interrogation regions. First, an optical manipulating means 1600 may alter the trajectory, spectral content, timing or duration of the laser radiation from laser 1400 to the second or third interrogation spots. Examples of items that may be included in optical manipulating means 1600 are a birefringent crystal, spinning prism, mirror, saturable absorber, acousto-optic modulator, harmonic crystal, Q-switch, for example. More generally, optical manipulating means 1600 may include one or more items that alter laser frequency, amplitude, timing or trajectory along one branch of the optical path to an additional interrogation region.

For example, optical manipulating means 1600 may include a beamsplitter and/or acousto-optic modulator. The beam splitter may separate a portion of the incoming laser beam into a secondary branch or arm, where this secondary branch or arm passes through the modulator which modulates the amplitude of the secondary beam at a high frequency. The modulation frequency may be, for example, about 2 MHz or higher. The light impinging on the first laser interrogation region 101 may, in contrast, be continuous wave (unmodulated). The secondary branch or arm is then directed to the additional laser interrogation region. This excitation will then produce a corresponding fluorescent pattern from an appropriately tagged cell.

This modulated fluorescent pattern may then be picked up by the detection optics 1100, which may recombine the detected fluorescence from other interrogation regions with fluorescence from laser interrogation region 101. The combined radiation may then impinge on the one or more detectors 1300.

An additional optical component 1700 may also alter the frequency, amplitude, timing or trajectory of the second beam path, however, it may perform this operation upstream (on the detector side) of the collection optics 1100 rather than downstream (on the sample side) of it, as does optical component 1600.

The output of detectors 1300 may be analyzed to separate the content corresponding to laser interrogation region 101 from the content corresponding to other laser interrogation regions. This may be accomplished by applying some electronic distinguishing means 1800 to the signals from detectors 1300. The details of electronic distinguishing means 1800 may depend on the choice for optical manipulation means 1600. For example, the distinguishing means 1800 may include a high pass stage and a low pass stage that is consistent with a photoacoustic modulator that was included in optical manipulating means 1600. Alternatively, electronic distinguishing means 1800 may include a filter (high pass and/or low pass) and/or an envelope detector, for example.

Therefore, depending on the choice of optical manipulating means 1600, the unfiltered signal output from detectors 1300 may include a continuous wave, low frequency portion and a modulated, high frequency portion. After filtering through the high pass filter stage, the signal may have substantially only the high frequency portion, and after the low pass stage, only the low frequency portion. These signals may then be easily separated in the logic circuits of computer 1900. Alternatively, the high pass filter may be an envelope detector, which puts out a signal corresponding to the envelop of the amplitudes of the high frequency pulses.

Other sorts of components may be included in electronic distinguishing means 1800 to separate the signals. These components may include, for example, a signal filter, mixer, phase locked loop, multiplexer, trigger, or any other similar device that can separate or distinguish the signals. Component 1800 may also include the high pass and/or low pass electronic filter or the envelope detector described previously. The two sets of signals from the electronic distinguishing means 1800 may be handled differently by the logic circuits 1900 in order to separate the signals.

The description now turns to the fabrication of the devices shown in FIGS. 1-17. Fabrication may begin formation of the valves 100' or 100. To make these structures, one may begin with formation of the inlaid permeable features 116 and 130 formed in a first substrate. The substrate may be a single crystal silicon substrate, for example. To form these structures, depressions may be formed in these areas of the substrate surface by etching. First, photoresist may be deposited over the substrate surface and removed over the areas corresponding to 116 and 130. Then, the trenches may be formed by, for example, etching the substrate in potassium hydroxide (KOH) to form a suitable depression. A seed layer may be deposited conformally over the first substrate surface and patterned to provide the seed layer for plating NiFe into the trenches. The seed layer may be, for example, Ti/W or Cr/Au and may be deposited by sputtering, CVD or plasma deposition. This layer may be covered with photoresist and patterned according to the desired shape of the areas 116 and 130. Unwanted areas of photoresist and seed layer may then be removed by chemical etching. The permeable features 116 and 10 may then be deposited over the patterned seed layer by sputtering, plasma deposition or electrochemical plating. It is known that permalloy (80% Ni and 20% Fe), for example, can readily be deposited by electroplating.

Alternatively, a liftoff method may be used to deposit a sheet of permeable material, most of which is then lifted off areas other than 116 and 130. Further details into the lithographic formation of inlaid, magnetically permeable materials may be found in, for example, U.S. Pat. No. 7,229,838. U.S. Pat. No. 7,229,838 is hereby incorporated by reference in its entirety. The substrate may then be planarized by chemical mechanical polishing (CMP), leaving a flat surface for the later bonding of a cover plate.

Having made the permeable features 116 and 130, the movable member or valve 110 may be formed. The surface may again be covered with photoresist and patterned to protect the inlaid permeable features 116 and 130. The sample inlet channel 120 and output channels 122 and relieved area 144 may be formed simultaneously with the movable member 110. With movable member 110, and other areas whose topography is to be preserved may be covered with photoresist, the features 110, 120, 122 and 144 may be formed by deep reactive ion etching (DRIE) for example.

To form the fluidic channels, a cover plate may be bonded to the surface of the substrate which was previously planarized for this purpose. The cover plate may be optically transparent to allow laser light to be applied to the particles in the fluid stream flowing in the sample inlet channel 120, and for fluorescence emitted by the fluorescent tags affixed to the particles to be detected by the optical detection system described above. A hole formed in this transparent material may form the waste channel 142. Alternatively, a waste channel 142 may be formed in a second substrate, such as a second silicon substrate, and bonded to the surface of the first substrate. Alternatively, output channel 142 may be formed on the opposite surface of the first substrate using a silicon-on-insulator (SOI) substrate, with waste channel 142 and orifice 140 formed in the handle layer and dielectric layer of the SOI substrate, and the movable feature formed in the device layer.

Additional details for carrying out this process outlined above are well known to those skilled in the art, or readily found in numerous lithographic processing references.

Accordingly, disclosed here is a micromechanical particle manipulation device. The device may include a sample inlet channel formed in a material, and through which a fluid flows, the fluid including target particles and non-target material, wherein the flow in the sample inlet channel is substantially in a single plane. It may also include a particle focusing element coupled to the sample inlet channel, wherein the focusing element is configured to urge the target particles into a particular region of the sample inlet channel, wherein the focusing element comprises a first portion with a variable channel cross section which urges particles into at least one locus in a particular portion of the cross section, and a second portion with a substantially uniform cross section, wherein the focusing element further comprises a bend that rotates the at least one locus to a second different portion of the cross section, and wherein the first portion, the second portion, and the bend together concentrate the target particles into a single locus within the sample inlet channel. It may also include a microfabricated sorting device that manipulates the target particles concentrated in the particular region of the sample inlet channel.

The microfabricated sorting device may have a first diverting surface, wherein the movable member moves from a first position to a second position in response to a force applied to the movable member, wherein the motion is substantially in a plane parallel to the surface of the substrate, a sample inlet channel formed in the substrate and through which a fluid flows, the fluid including target particles and non-target material, wherein the flow in the sample inlet channel is substantially parallel to the surface, and a plurality of output channels including a sort output channel into which the microfabricated member diverts the target particles, and a waste output channel into which the non-target material flows, and wherein the flow in waste output channel is substantially orthogonal to the plane, and wherein the waste output channel is located directly below at least a portion of the microfabricated member over at least a portion of its motion.

The bend may include at least one of a change in aspect ratio (height/width) from less than one to greater than one, and 90 degree an out-of-plane bend. The variable cross section portion of the focusing element channel may define a triangular cavity, wherein the cavity is characterized by a cavity height H, and a cavity width L, and a cavity angle.

In some emboidoiments, at least a part of the variable cross section portion may maintain an aspect ratio (height/width) of more than one. In other embodiments, at least a part of the variable cross section portion maintains an aspect ratio (height/width) of less than one, and at least another part of the variable cross section portion maintains an aspect ratio (height/width) of more than one.

The first portion of the focusing element may be disposed in a first portion of material and the second portion of the focusing element is disposed in a second portion of material and the first portion of material is joined to the second portion of material by a glue line. In some embodiments, the cavities may have cavity size (H/W) of about 5 to 15. In some embodiments, the cavities have a pitch ratio (P/H) of about 4. In some embodiments, the flow rate within the focusing element may be about 8 ml/hour. In some embodiments, the sample inlet channels have an aspect ratio W/D of less than about 1. In some embodiments, the focusing element has at least one acute bend, defining an inner surface of the acute bend and an outer surface of the acute bend, and wherein the plurality of cavities are all disposed on the outside of the acute bend.

In some embodiments, the straight and non-parallel segments define expansion/contraction cavities which balance the Dean force and the frictional force, thereby bringing the particles to a stable two-dimensional focus within the focusing element. In some embodiments, the focusing element may be disposed in the same plane as the movable member, and formed in the same substrate.

In some embodiments, the micromechanical particle manipulation device of claim 1, wherein the sample inlet channel and focusing elements both have characteristic dimensions of about 50-150 microns.

In some embodiments, the target particles may be at least one of a stem cell, a cancer cell, a zygote, a protein, a T-cell, a bacteria, a component of blood, and a DNA fragment.

Some embodiments may include an electromagnet which produces magnetic flux. The movable member may moves from the first position to the second position when the electromagnet is activated. The device may further include a first permeable magnetic material inlaid in the movable member and a first stationary permeable magnetic feature disposed on the substrate, and a first source of magnetic flux external to the movable member and substrate on which the movable member is formed. The force may be at least one of magnetic, electrostatic, and piezoelectric.

Further described is a particle manipulation system included the particle manipulation device. The system may include, along with the partical manipulation device, at least one laser directed to a laser interrogation region disposed in the sample inlet channel, configured to irradiate the particles in the sample inlet channel, and at least one set of detection optics that detects a fluorescent signal from a fluorescent tag affixed to the target particle in the fluid. The system may further include an electromagnet, configured to move the microfabricated, movable member the first position to the second position to manipulate the target particles concentrated in the particular region of the sample inlet channel, and a circuit that provides a control waveform to the electromagnet.

While various details have been described in conjunction with the exemplary implementations outlined above, various alternatives, modifications, variations, improvements, and/or substantial equivalents, whether known or that are or may be presently unforeseen, may become apparent upon reviewing the foregoing disclosure. Accordingly, the exemplary implementations set forth above, are intended to be illustrative, not limiting

What is claimed is:

1. A micromechanical particle manipulation device, comprising:
a sample inlet channel formed in a material, and through which a fluid flows, the fluid including target particles and non-target material, wherein the flow in the sample inlet channel is substantially in a single plane,
a particle focusing element coupled to the sample inlet channel, wherein the particle focusing element is configured to urge the target particles into a particular region of the sample inlet channel, wherein the focusing element comprises a first portion with a variable cross section which urges particles into at least one locus in a particular portion of the cross section, and a second portion with a substantially uniform cross section;
and wherein the focusing element further comprises a bend that rotates the at least one locus to a second different portion of the cross section, and wherein the first portion, the second portion, and the bend together concentrate the target particles into a single locus within the sample inlet channel; and
a microfabricated sorting device that manipulates the target particles concentrated in the particular region of the sample inlet channel, wherein the microfabricated sorting device has a first diverting surface, wherein the movable member moves from a first position to a second position in response to a force applied to the movable member, wherein the motion is substantially in another plane parallel to the surface of the substrate;
a sample inlet channel formed in the substrate and through which a fluid flows, the fluid including target particles and non-target material, wherein the flow in the sample inlet channel is substantially parallel to the surface; and
a plurality of output channels including a sort output channel into which the microfabricated member diverts the target particles, and a waste output channel into which the non-target material flows, and wherein the flow in waste output channel is substantially orthogonal to the plane, and wherein the waste output channel is located directly below at least a portion of the microfabricated member over at least a portion of its motion.

2. The micromechanical particle manipulation device of claim 1, wherein the bend comprises at least one of a change in aspect ratio (height/width) from less than one to greater than one.

3. The micromechanical particle manipulation device of claim 1, wherein the variable cross section portion of the particle focusing element channel defines a triangular cavity, wherein the cavity is characterized by a cavity height H, and a cavity width L, and a cavity angle.

4. The micromechanical particle manipulation device of claim 1, wherein at least a part of the variable cross section portion maintains an aspect ratio (height/width) of more than one.

5. The micromechanical particle manipulation device of claim 1, wherein at least a part of the variable cross section portion maintains an aspect ratio (height/width) of less than one, and at least another part of the variable cross section portion maintains an aspect ratio (height/width) of more than one.

6. The micromechanical particle manipulation device of claim 1, wherein the first portion of the focusing element is disposed in a first portion of material and the second portion of the particle focusing element is disposed in a second portion of material and the first portion of material is joined to the second portion of material by a glue line.

7. The micromechanical particle manipulation device of claim 2, wherein the cavities have cavity size (H/W) of about 5 to 15.

8. The micromechanical particle manipulation device of claim 2, wherein the cavities have a pitch ratio (P/H) of about 4.

9. The micromechanical particle manipulation device of claim 3, wherein the flow rate within the particle focusing element is about 8 ml/hour.

10. The micromechanical particle manipulation device of claim 2, wherein the sample inlet channels have an aspect ratio W/D of less than about 1.

11. The micromechanical particle manipulation device of claim 3, wherein the particle focusing element has at least one acute bend, defining an inner surface of the acute bend and an outer surface of the acute bend, and wherein the plurality of cavities are all disposed on the outside of the acute bend.

12. The micromechanical particle manipulation device of claim 2, wherein straight and non-parallel segments define expansion/contraction cavities which balance the Dean force and the frictional force, thereby bringing the particles to a stable two-dimensional focus within the particle focusing element.

13. The micromechanical particle manipulation device of claim 1, wherein the particle focusing element is disposed in the same plane as the movable member, and formed in the same substrate.

14. The micromechanical particle manipulation device of claim 1, wherein the sample inlet channel and particle focusing elements both have characteristic dimensions of about 50-150 microns.

15. The micromechanical particle manipulation device of claim 1, wherein the target particles are at least one of a stem cell, a cancer cell, a zygote, a protein, a T-cell, a bacteria, a component of blood, and a DNA fragment.

16. The micromechanical particle manipulation device of claim 1, further comprising:
an electromagnet.

17. The micromechanical particle manipulation device of claim 12, wherein the movable member moves from the first position to the second position when the electromagnet is activated.

18. The micromechanical particle manipulation device of claim 1, further comprising: a first permeable magnetic material inlaid in the movable member;
a first stationary permeable magnetic feature disposed on the substrate; and
a first source of magnetic flux external to the movable member and substrate on which the movable member is formed.

19. The micromechanical particle manipulation device of claim 1, wherein the force is at least one of magnetic, electrostatic, and piezoelectric.

* * * * *